US012756244B2

(12) United States Patent

Ganesh et al.

(10) Patent No.: US 12,756,244 B2

(45) Date of Patent: Oct. 6, 2026

(54) ALIGNMENT FOR WIRELESS POWER TRANSFER USING ELECTROMAGNETS

(71) Applicant: Dolby Intellectual Property Licensing, LLC, San Francisco, CA (US)

(72) Inventors: Jayanti Ganesh, Bangalore (IN); Subbarao Takikonda, Bangalore (IN); Viswanathan Kanakasabai, Bangalore (IN)

(73) Assignee: Dolby Intellectual Property Licensing, LLC, San Francisco, CA (US)

( * ) Notice: Subject to any disclaimer, the term of this patent is extended or adjusted under 35 U.S.C. 154(b) by 0 days.

(21) Appl. No.: 18/967,065

(22) Filed: Dec. 3, 2024

(65) Prior Publication Data

US 2025/0183735 A1 Jun. 5, 2025

(30) Foreign Application Priority Data

Dec. 4, 2023 (IN) ............................. 202311082327

(51) Int. Cl.

| | |
|---|---|
| ***H02J 50/90*** | (2016.01) |
| ***H01F 7/06*** | (2006.01) |
| ***H01F 7/126*** | (2006.01) |
| ***H02J 7/90*** | (2026.01) |
| ***H02J 50/10*** | (2016.01) |

(52) U.S. Cl.

CPC .............. *H02J 50/90* (2016.02); *H01F 7/064* (2013.01); *H01F 7/126* (2013.01); *H02J 7/933* (2026.01); *H02J 50/10* (2016.02)

(58) Field of Classification Search

CPC ........ H02J 50/90; H02J 7/00712; H02J 50/10; H01F 7/1064; H01F 7/126

See application file for complete search history.

(56) References Cited

U.S. PATENT DOCUMENTS

| | | | | |
|---|---|---|---|---|
| 11,855,464 | B1 * | 12/2023 | Liu | H01F 38/14 |
| 2013/0285604 | A1 * | 10/2013 | Partovi | H02J 7/0044 320/108 |
| 2019/0378650 | A1 * | 12/2019 | Boys | H01F 27/36 |
| 2023/0013502 | A1 * | 1/2023 | Sekizawa | H02J 7/0063 |
| 2025/0141284 | A1 * | 5/2025 | Vlad | H02K 21/24 |

* cited by examiner

*Primary Examiner* — Ryan Johnson

*Assistant Examiner* — Esayas G Yeshaw

(74) *Attorney, Agent, or Firm* — Flaster Greenberg PC

(57) ABSTRACT

An apparatus may be configured to operate in a power transmitter mode and a power receiver mode. The apparatus may include at least one power transfer coil. The at least one power transfer coil may be configured to receive a current to produce magnetic flux, for example when the apparatus is operating in the power transmitter mode. The power transfer coil may be configured to produce a current based on received magnetic flux, for example when the apparatus in operating in the power receiver mode. The apparatus may include a plurality of electromagnets arranged in an array around the at least one power transfer coil. The apparatus may include a control unit configured to determine when to supply a current to the plurality of electromagnets, for example based on whether the apparatus is operating in at least one of the power transmitter mode or the power receiver mode.

22 Claims, 24 Drawing Sheets

ALIGNMENT FOR WIRELESS POWER TRANSFER USING ELECTROMAGNETS

BACKGROUND

Wireless power systems are used to charge an energy storage device. The energy storage device may be in a wireless device. Example wireless devices may include a smartphone, earbuds, tools, medical devices, and/or vehicles. One or more coils (e.g., may be referred to as a primary coil), for example in a wireless device, may be configured to transmit power to another device. Additionally, or alternatively, the one or more coils may be configured to receive power from another device (e.g., may be referred to as a secondary coil). The wireless device may transmit and/or receive power when in proximity to another wireless device.

SUMMARY

The application is generally related to devices and methods for wireless charging, for example in a wireless device, and more particularly, to the use of an electromagnet array for alignment during charging. The use of the electromagnet array may be used in order to assist in enabling the device to use a set of one or more coils for operating in a power transfer mode of operation (e.g., the one or more coils operating as a primary coil for providing power to a peer device). The electromagnet array may be used in another device set to receive power in the power reception mode of operation (e.g., the one or more coils operating as a secondary coil for receiving power from a peer device).

For example, an apparatus may be configured to operate in a power transmitter mode and/or a power receiver mode. The apparatus may include at least one power transfer coil. The at least one power transfer coil may be in the power transmitter mode when regulating a current or voltage or power transferred through the coil.

Based on a received magnetic flux, the apparatus may have a voltage induced resulting in a current flow. For example, the apparatus may be in the power receiver mode when receiving power. The apparatus may include one or more electromagnets. The one or more electromagnets may be arranged around the at least one power transfer coil, for example in an array.

The apparatus may include a control unit. The control unit may be configured to determine when to supply a current to one or more electromagnets. For example, the control unit may be configured to determine when to supply a current to one or more electromagnets based on whether the apparatus is operating in the power transmitter mode and/or the power receiver mode. The control unit may determine to apply a current to one or more electromagnets based on determining that the apparatus is operating in the power transmission mode. The control unit may determine to not apply a current to one or more electromagnets based on determining that the apparatus is operating in the power receiver mode. The control unit may be configured to determine to apply a current to a subset of the plurality of electromagnets.

One or more (e.g., each) of the electromagnets may include a (e.g., respective) ferrite. The one or more electromagnets may be electrically connected in series, for example the coils around the ferrites may be connected in series. A coil around a respective ferrite may be configured to generate a pole direction for the ferrite. For example, (e.g., respective) coils around the one or more (e.g., each) ferrites may be configured in an alternating pattern such that the one or more electromagnets generate an alternating pole arrangement when a current is applied to the plurality of electromagnets.

The electromagnets may be arranged in an inner array of electromagnets and an outer array of electromagnets. For example, the inner array of electromagnets may include respective coils in a first direction around respective ferrites to generate a first pole direction when a current is applied to the inner array of electromagnets. Additionally, or alternatively, the outer array of electromagnets may include respective coils in a second direction around the respective ferrites to generate a second pole direction when a current is applied to the outer array of electromagnets. Coils (e.g., respective coils) around the plurality of ferrites may be configured in an alternating pattern, for example such that the plurality of electromagnets generate an alternating pole arrangement when a current is applied to the plurality of electromagnets. The ferrites and the coils may be disposed in the same substrate and/or printed circuit board (PCB).

One or more of the electromagnets may be electrically connected in series. For example, at least one electromagnet in the inner array may be electrically connected in series to two respective electromagnets in the outer array. Additionally, or alternatively, at least one electromagnet in the outer array may be electrically connected in series to two respective electromagnets in the inner array. In another example, each of the plurality of electromagnets in the inner array may be electrically connected in series. Additionally, or alternatively, each of the plurality of electromagnets in the outer array may be electrically connected in series. It may be noted that the multiple variations of arrangement of electromagnets discussed so far, may be used in a transmitter device, a receiver device, or on a device that can be used as both transmitter and receiver.

The control unit may be configured to determine to apply a current to one or more of the plurality of electromagnets. For example, the control unit may determine whether to apply current based when the apparatus is operating in the power receiver mode on condition that a battery of the apparatus is above a threshold power/charge level. For example, the threshold power/charge level may be 20% of a maximum power/charge level of the battery. The control unit may be configured to determine whether to activate a current in the at least one power transfer coil based on, for example, a power/charge level of one or more of the battery or a second battery electrically connected to at least one secondary coil of a peer (e.g., power receiver) device.

The control unit may be configured to determine to apply a current to one or more of the plurality of electromagnets when the apparatus is (e.g., initially) operating in the power transmitter mode. The control unit may (e.g., then) determine to stop applying current to the plurality of electromagnets, for example based on determining that at least one secondary coil of a peer power receiver device is in alignment with the at least one power transfer coil.

The control unit may be configured to determine information associated with at least one secondary coil of a peer power receiver device. The information may include a power level of a (e.g., second) battery electrically connected to at least one secondary coil of a peer power receiver device. Additionally, or alternatively, the control unit may be configured to determine whether to activate a coupling (e.g., latching) current in the at least one power transfer coil for coupling to the at least one secondary coil of a peer power receiver device. For example, the control unit may determine whether to activate the coupling current based on the information associated with the at least one secondary coil of the peer power receiver device. The control unit may be configured to determine to decrease the coupling current. For example, the control unit may determine to decrease the coupling current based on one or more of a time threshold, or on a power level of one or more of the battery or the second battery electrically connected to the at least one secondary coil of the peer power receiver device. The time threshold may be associated with a start time of the coupling current.

Additional features and advantages are realized through the system of the present disclosure. Other embodiments and aspects of the disclosure are described in detail herein. For a better understanding of the disclosure with advantages and features, refer to the description and to the drawings.

BRIEF DESCRIPTION OF THE DRAWINGS

Many aspects of the disclosure can be better understood with reference to the following drawings. The components in the drawings are not necessarily to scale, with emphasis being placed upon clearly illustrating the principles of the present disclosure. Moreover, in the drawings, like reference numerals designate corresponding parts throughout the several views. Furthermore, each drawing contained in this provisional application includes at least a brief description thereon and associated text labels further describing associated details.

DETAILED DESCRIPTION

Figure 1:
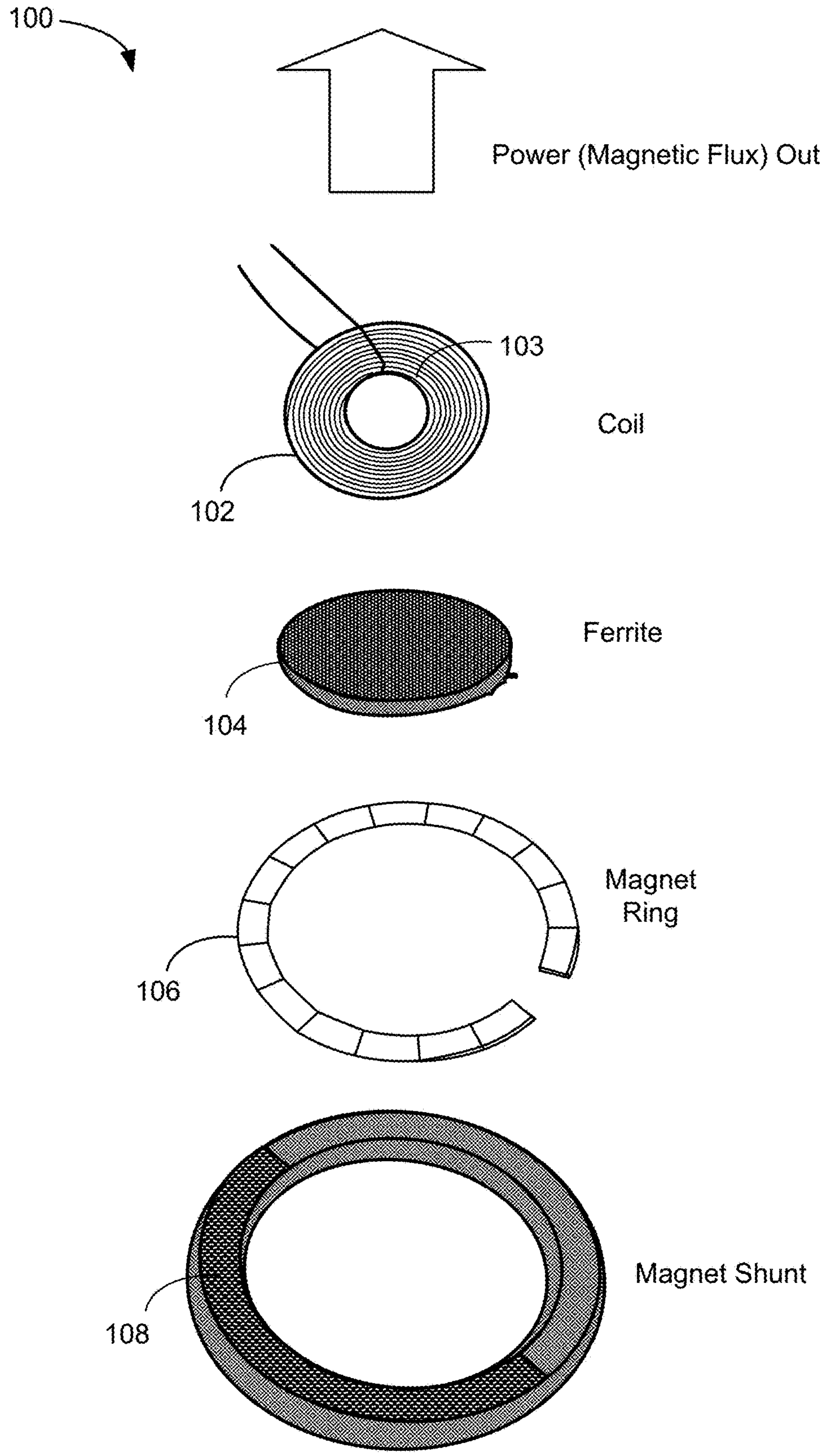
FIG. 1 is a view of an example transmitter.

In furtherance of the brief description provided above and associated textual detail of each of the figures, the following description provides additional details of example embodiments.

Detailed illustrative examples are disclosed herein. However, specific functional details disclosed herein are merely representative for purposes of describing example embodiments. Examples may, however, be embodied in many alternate forms and should not be construed as limited to only the embodiments set forth herein.

Accordingly, while examples are capable of various modifications and alternative forms, embodiments are shown by way of example in the drawings and will herein be described in detail. It should be understood, however, that there is no intent to limit examples to the particular forms disclosed. To the contrary, examples are to cover all modifications, equivalents, and alternatives falling within the scope of examples.

It will be understood that, although the terms first, second, etc. may be used herein to describe various elements, steps, and/or calculations, these elements, steps, and/or calculations should not be limited by these terms. These terms are only used to distinguish one element, step, and/or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises." "comprising," "includes"" and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Herein, example embodiments of the present disclosure will be described in detail. Example embodiments of the present disclosure provide an apparatus and method as described below.

FIG. 1 is a view of an example transmitter 100. The apparatus 100 may include a coil 102, a ferrite 104, a magnet array 106, and/or a permeable magnet shunt 108. The transmitter 100 may be configured to transmit power, for example in a direction generally orthogonal to a surface 103 of the coil 102. The transmitter 100 may be configured to operate in a power transmitter mode, for example by applying a AC voltage and hence a resultant current to coil 102 (e.g., acting as a primary coil) in order to generate magnetic flux that can be received at a peer device coil in order to induce a voltage and hence a resultant current at a peer coil (e.g., acting as a secondary coil). Magnetic ring 106 may be designed in order to align with a reciprocal magnet ring at the peer device in order to align coil 102 with the peer coil in an attempt to maximize the amount of power transfer from apparatus 100 to the peer device.

Figure 2:
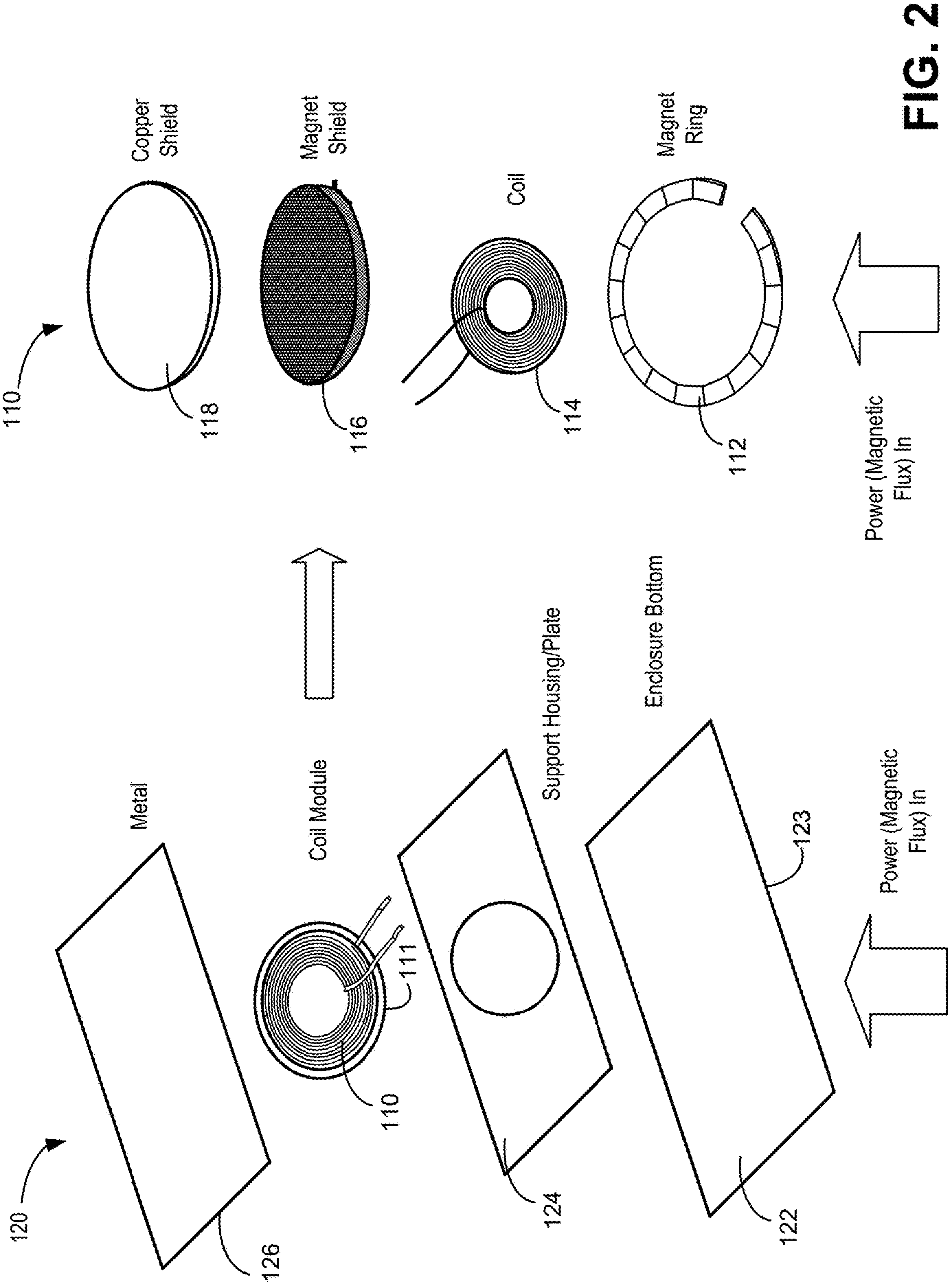
FIG. 2 is a view of an example device with a receiver.

FIG. 2 is a view of an example device 120 with a coil module 110. The coil module 110 may be disposed in a device 120, for example a peer power receiver device. The device 120 may include an enclosure 122, a support plate 124, the coil module 110, and/or a friendly metal 126. The device 120 may be a wireless device. Example wireless devices may include a smartphone, earbuds, tools, medical devices, and/or vehicles. Power may be received at the device 120, for example in a direction generally orthogonal to a surface 123 of the enclosure 122 and/or a surface 111 of the coil module 110. The coil module 110 may include a magnet array 112, a charging coil 114, magnetic shielding 116, and/or copper shielding 118. Although the coil module 110 may be shown as operating in a power receiver mode of operation in FIG. 2, the coil module 110 may be configured to operate in a power receiver mode and a power transmitter mode. The coil module 110 may receive power from a transmitter, for example after the coil module 110 and a transmitter are aligned. Alignment may be achieved using the magnet array 112 of the receiver 110 and the magnet array of the transmitter. For example, magnetic flux may be received in a direction substantially orthogonal to the surface 111 and voltage is induced in the charging coil 114 such that, for example, current can flow to charge a battery of device 120. Although a battery is discussed herein, any power storage device may be utilized additionally, or alternatively to the battery. Alternatively, or additionally, the devices herein may utilize no power storage device. A device in transmission mode and/or receiver mode may receive power from an external source without storing at least some of the power. Additionally, or alternatively, a device in transmission mode and/or receiver mode may transfer at least some of the power to a peer device, for example without storing at least some of the power.

Figure 3:
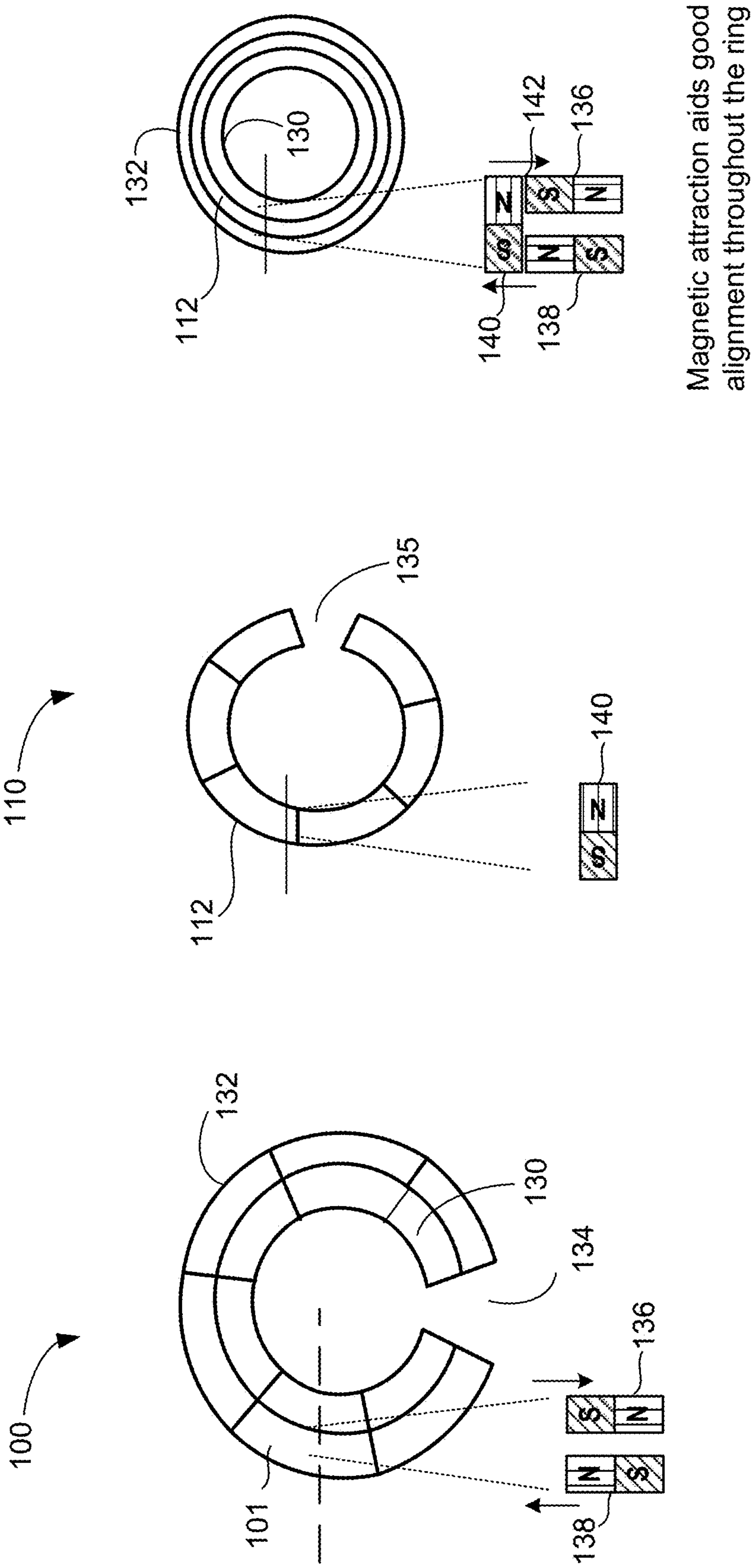
FIG. 3 is a view of an example of the magnetic alignment of an example transmitter in accordance with FIG. 1 and an example receiver in accordance with FIG. 2.

FIG. 3 is a view of an example of magnetic alignment of an example transmitter 100 in accordance with FIG. 1 and an example receiver 110 in accordance with FIG. 2. The transmitter 100 may include an inner array 130 and an outer array 132. The inner array 130 and/or the outer array 132 may (e.g., each) include one or more permanent magnets. The transmitter 100 may include a magnet gap 134, which may include an inner gap and an outer gap. For example, the inner gap may be 8.25 mm and/or the outer gap may be 10.00 mm. The inner array 130 may be configured to generate a first pole direction 136, Additionally, or alternatively, the outer array 132 may be configured to generate a second pole direction 138, The first pole direction 136 may be the same or different than the second pole direction 138. For example, the first pole direction 136 of the inner array 130 may be arranged such that the south pole is proximate a surface 101 of the transmitter 100. Additionally, or alternatively, the second pole direction 138 may be arranged such that the north pole is proximate a surface 101 of the transmitter 100. The surface 101 may be proximate a transmission direction of magnetic flux from the transmitter 100.

The receiver 110 may include a magnet array 112. For example, the magnet array 112 may include one or more permanent magnets. The receiver may include a magnet gap 135, which may include an inner gap and an outer gap. For example, the inner gap may be 9.55 mm and/or the outer gap may be around 11.00 mm. The magnet array 112 may be configured to generate a pole direction 140. The pole direction 140 may be arranged such that the south pole is oriented proximate a north pole of the second pole direction 138 and/or the north pole is oriented proximate a south pole of the first pole direction 136 of the transmitter 100. The transmitter 100 and receiver 110 are shown in alignment with a gap 142 between the pole direction 140 and pole directions 136, 138. Casings of the transmitter 100 and receiver 140 and/or air gaps may be contributors to the gap 142. The transmitter 100 and receiver 110 are shown aligned such that magnetic field lines and the pole directions 136, 138, 140 aid attraction of the transmitter and receiver magnets resulting in a good alignment.

Figure 4:
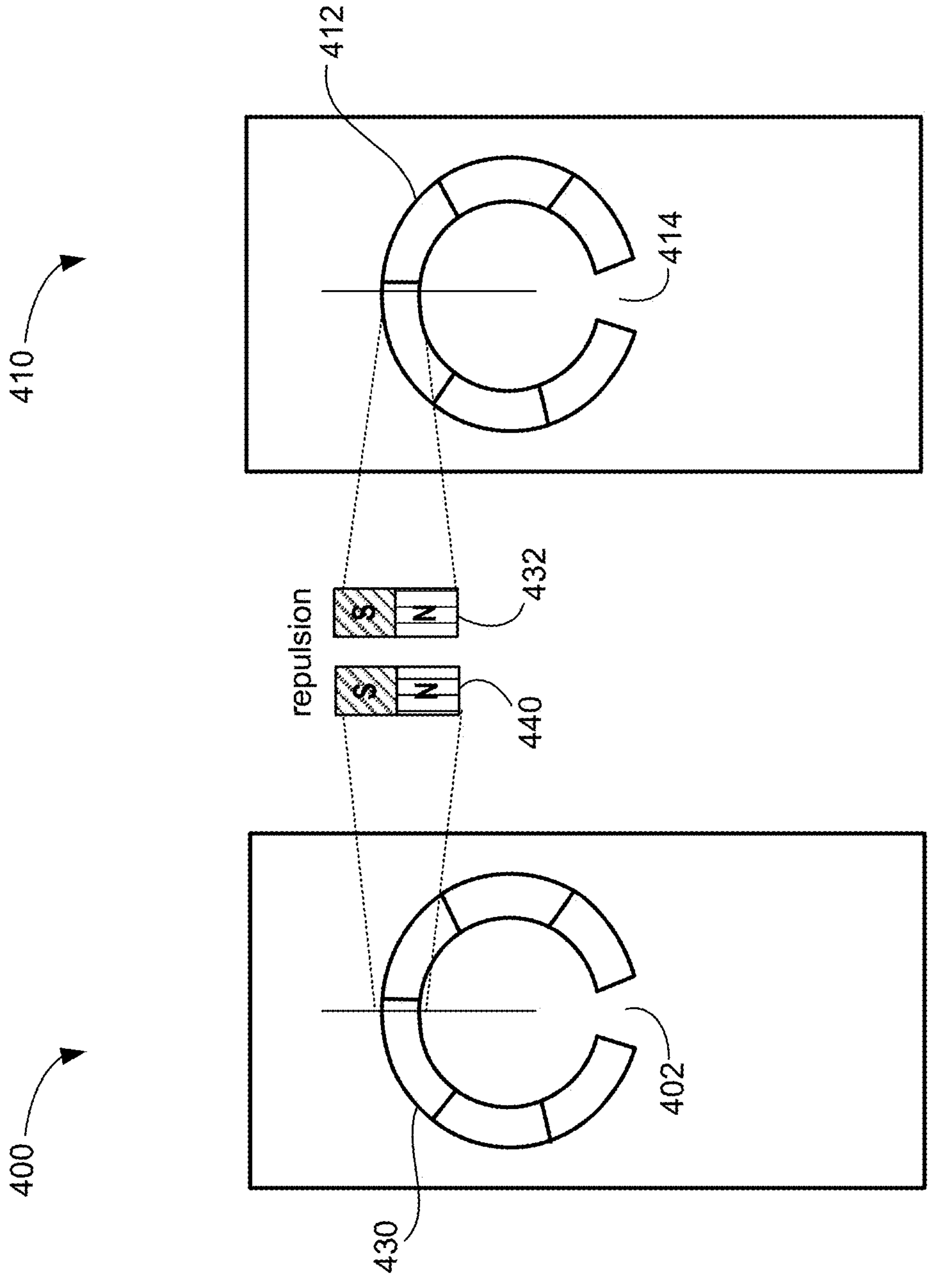
FIG. 4 is a view of an example of repulsion present when the magnetic alignment mechanism of two example transmitters in proximity to each other.

FIG. 4 is illustrative of an example problem faced when a both a charging device and a receiving device utilize permanent magnets around their respective coils in order to facilitate alignment of their respective (e.g., secondary) coils in order to attempt to transfer power between devices. For example, a device such as a smartphone may typically operate in a power receiver mode when it is configured to receive magnetic flux in order to convert the magnetic flux to current in order to charge a battery. Since the device is designed mainly to receive, rather than transfer, power wirelessly, the device may include a permanent magnet array substantially similar to arrangement 110 of FIG. 3. However, the device may be configured to operate in a power transfer mode of operation in addition to a power receiver mode of operation. However, in such a scenario, both the power transmitter and power receiver may include permanent magnet arrays that are substantially similar to the arrangement shown at 110 in FIG. 3.

As a result, an example transmitter 400 and an example receiver 410 of FIG. 4 may repulse each other when aligned for power transfer. For example. a magnet array 430 of the transmitter 410 and/or a magnet array 412 of the receiver 410 may include one or more permanent magnets. The magnet array 430 may be configured to generate a first pole direction 432 such that the north pole is oriented proximate a first end 402 of the transmitter 400. The magnet array 412 may be configured to generate a second pole direction 440 such that the north pole is oriented proximate a first end 414 of the receiver 410. The first pole direction 432 and the second pole direction 440 may be such that respective south poles are proximate and respective north poles are proximate, which may result in the transmitter 400 and the receiver 410 repelling each other. In order to address this issue of repulsion, the present disclosure provides examples of electromagnet arrays that may be used together with, or alternatively to, permanent magnets in order to allow the pole positions to be varied depending, for example, on the mode of operation of the device.

Figure 5:
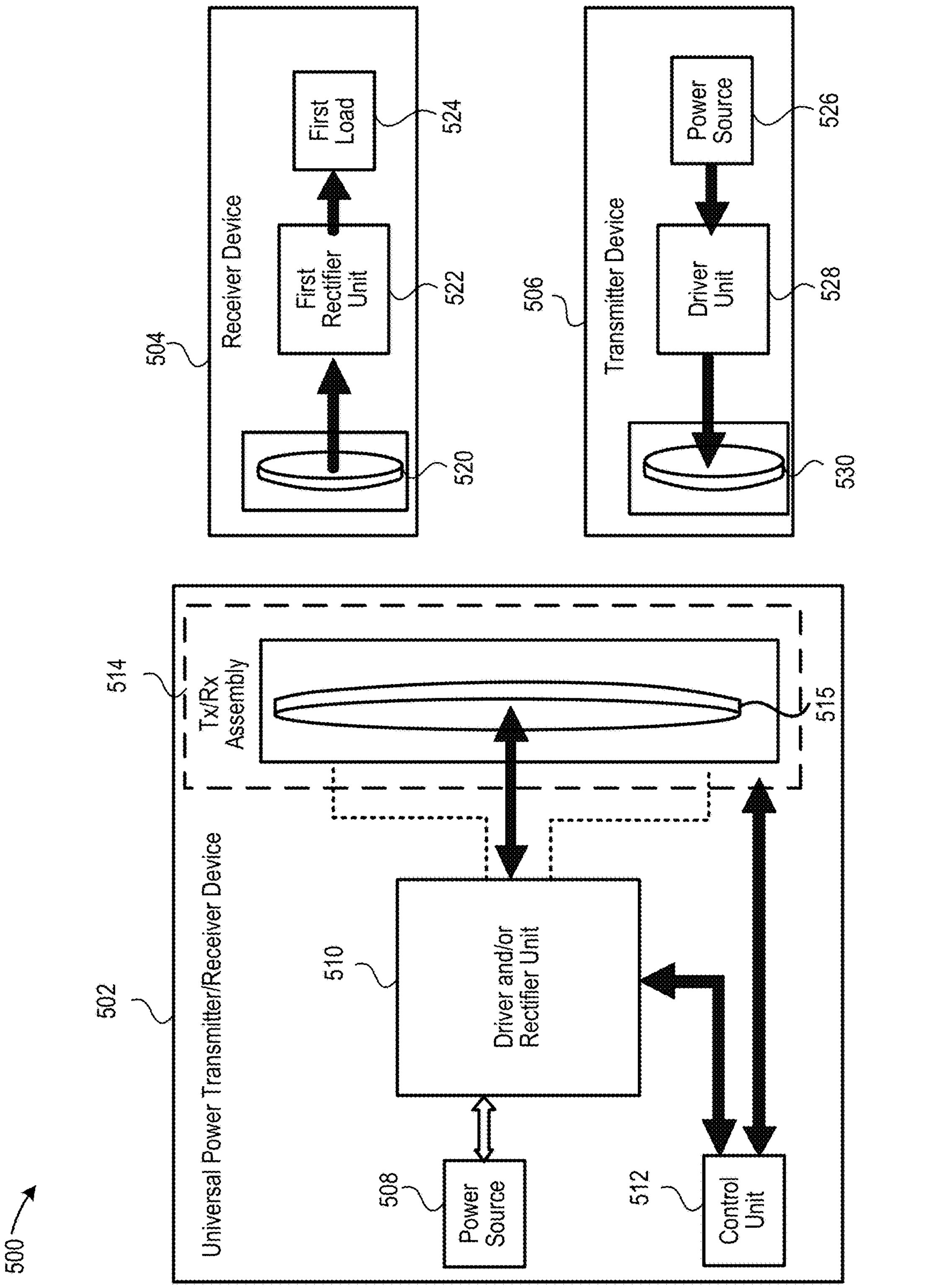
FIG. 5 is a block system diagram of a wireless power transfer system that includes a device capable of acting as either a power transmitter or a power receiver.

FIG. 5 is a block system diagram of a wireless power transfer system 500. The wireless power transfer system 500 may be used to transmit electric power to one or more receiver devices such as mobile devices, biomedical devices, portable consumer devices, and the like. For example, in an automobile industry, a vehicle includes one or more charging pads that are used to wirelessly transmit the electric power to mobile devices to charge batteries in the mobile devices. The mobile devices may be cell phones, laptops, and the like.

The wireless power transfer system 500 may include a universal wireless charging device 502 that may be wirelessly coupled to a receiver device 504 and/or a second receiver device 506. It may be noted that the terms "universal wireless charging device," "wireless charging device," and "charging pad" may be used interchangeably in the following description. Further, the first and second receiver devices 504, 506 may be compatible with one of the wireless frequency standards. For example, one of the receiver devices may be compatible with a first frequency standard defined for low power transfer, such as a NFC power transfer standard. Similarly, another receiver device may be compatible with the Wireless Power Consortium (WPC) with Qi standard that is defined in a frequency range from 100 kHz to 400 kHz. For ease of explanation, the receiver device 504 may be considered to be compatible with a first frequency standard, for example the NFC standard. Similarly, the second receiver device 506 may be considered to be compatible with a second frequency standard, for example the Qi standard. Although the first and second receiver devices 504, 506 are described as adhering to one of the two currently available frequency standards, it may be noted that the receiver devices 504, 506 may adhere to other and/or additional frequency standards and are not limited to the frequency standards mentioned herein. Moreover, although the presently contemplated configuration of FIG. 5 depicts the system 500 as including two receiver devices 504, 506, use of any number of receiver devices that are compatible with one or more frequency standards is envisioned.

In conventional power transfer systems, a charging device may be operated at only one frequency standard to transmit electric power to the receiver devices. Hence, separate charging devices having a dedicated converter and a dedicated coil for each frequency standard may be employed to transmit the electric power to the corresponding receiver device. However, using separate charging devices for each frequency standard may (e.g., substantially) increase costs associated with the set-up and maintenance of the conventional power transfer systems. Additionally, or alternatively, using separate charging devices to charge the receiver devices having different frequency standards may be inconvenient for a user.

To overcome the above drawbacks associated with the conventional power transfer systems, the power transfer system 500 may include a wireless transmitter/receiver device 502. This a wireless transmitter/receiver device 502 may be configured to operate in a power transfer mode of operation or a power receiver mode of operation. For example, a wireless transmitter/receiver device 502 charge one or more receiver devices 504, and a wireless transmitter/receiver device 502 may receive power from transmitter device 506. The power transfer may be performed in accordance with one or more different frequency standards. The wireless transmitter/receiver device Transmitter/Receiver (Tx/Rx) Assembly 514 may include a coil structure 515 that aids in charging the receiver device 504 and/or receiving a charge from transmitter device 506. The wireless transmitter/receiver device 502 may be implemented in order or more devices such as a smartphone, charging pad, vehicle, and/or any other device operatable to transmit or receive power wirelessly.

The wireless transmitter/receiver device 502 may include a power source 508 that, for example may include a battery connected to one or more of a bidirectional battery charger or a de power source, a driver and/or rectifier unit 510, a control unit 512, and/or a Tx/Rx assembly 514. The driver and/or rectifier unit 510 may be electrically coupled to the power source 508, the control unit 512, and/or the Tx/Rx assembly 514. The power source 508 may be configured to supply an input power having a DC voltage to driver and/or rectifier unit 510. For example, the input power may be in a range from about 1 W to about 200 W. The power source 508 may be a part of the wireless transmitter/receiver device 502. The power source 508 may be positioned external to the wireless transmitter/receiver device 502. It may be noted that the input power having the DC voltage supplied by the power source 508 may be referred to as a "DC voltage signal" in the following description. Such a signal may be from a dc source, or from a bidirectional converter connected to a battery internal to the device 502 (not shown).

The control unit 512 may be configured to generate a first control signal and/or a second control signal at regular time intervals. The control unit 512 may generate the first and/or second control signals based on user input data and/or data that is pre-stored in the control unit 512, or based on a protocol exchange between the devices once they are in handshake. In one embodiment, the control unit 512 may generate the first and/or second control signals based on any change in characteristics, for example of the Tx/Rx assembly 514. The characteristics of the Tx/Rx assembly 514 may include one or more of impedance, electric current, and/or voltage in the Tx/Rx assembly 514. For example, if the receiver device 504 and/or the transmitter device 506 is proximate to the wireless charging device 502, the characteristics of the Tx/Rx assembly 514 may change. A change in the characteristics of the Tx/Rx assembly 514 due to the receiver device 504 may be different from the characteristics of the Tx/Rx assembly 514 due to the transmitter device 506. Thus, based on signals characteristics of Tx/Rx assembly 514, control unit 512 may be configured to determine whether the power transmitter/receiver device is in proximity to receiver device 504 (e.g., and should operate in power transfer mode of operation) or transmitter device 504 (e.g., and should operate in power receiver mode of operation). Once the device 502 senses the proximity of the other device 504 or 506 for example, a handshake protocol between the devices 502 and 502/506 may determine the device that will act as transmitter and the device that will act as a receiver. In other words, whether 502 should act as a transmitter or as a receiver may be determined, for example based on a handshake protocol. One or more coil may detect a coil of a peer device, for example a coil of a peer device in the transmitter mode and/or in the receiver mode. For example, the one or more coil may be an NFC coil (e.g., a single turn NFC coil). The coil may (e.g., then) communicate to the control unit for control based on detection of the peer device (e.g., a coil of a peer device in the transmitter mode and/or in the receiver mode).

The control unit 512 may monitor the change in the characteristics of the Tx/Rx assembly 514, for example to identify the source of the change in the characteristics of the Tx/Rx assembly 514. The control unit 512 may identify the receiver device 504 and/or the transmitter device 506 as the source of the change in the characteristics of the Tx/Rx assembly 514. The control unit may additionally, or alternatively identify the transmitter device 506 and/or the receiver device 504 based on the protocol exchange between 502 and the proximate device 504/506. Alternately, or additionally, a user intervention (e.g., user input) may be used by the control unit to determine if the device 502 will act as a transmitter or a receiver of power. If the receiver device 504 is identified by the control unit 512 for example, the control unit 512 may generate the first control signal to operate the driver and/or rectifier unit 510 using a driver portion of 510 in order to supply current to Tx/Rx assembly 514 in order to transfer power to receiver device 504. If the transmitter device 506 is identified for example, the control unit 512 may generate the second control signal to operate the driver and/or rectifier unit 510 using a rectifier portion of 510 in order to receive power from transmitter device 506 and store it in the local storage (not shown).

The driver and/or rectifier unit 510 may be configured to receive the DC voltage signal from the power source 508 when operating in the transmitter mode of operation. Additionally, or alternatively, the driver and/or rectifier unit 510 may be configured to receive the first control signal and/or the second control signal from the control unit 512. The driver and/or rectifier unit 510 may be configured to transform the DC voltage signal based on receipt of the first control signal. If the first control signal is received from the control unit 512 for example, the driver and/or rectifier unit 510 may be configured to convert the DC voltage signal to a first AC voltage signal having a first frequency.

If the second control signal is received from the control unit 512 for example, the driver and/or rectifier unit 510 may be configured to receive an AC voltage signal from the Tx/Rx assembly 510 and/or convert the AC voltage signal to a first DC voltage signal, for example using a rectifier portion of 510. The first DC voltage signal may be used to charge the power source 508, such as a battery in the receiver device 504.

The Tx/Rx assembly 514 may be configured to wirelessly transmit an AC voltage signal to the receiver device 504. The electric power for charging the receiver device 504 may be transmitted in the form of the AC voltage signal to the receiver devices 504. The Tx/Rx assembly 514 may include a coil structure and/or one or more capacitors that are configured to transmit the first AC voltage signal to the receiver device 504. In FIG. 5 for example, the coil structure in the Tx/Rx assembly 514 may include one or more coils and one or more capacitors. For example, a first coil and the first capacitor may be coupled to a driver portion of driver and/or rectifier unit 510. The first capacitor may be coupled in series with the first coil. It may be noted that the transmitting assembly 514 may include a plurality of first coils and/or a plurality of second coils, and is not limited to one first coil and one second coil. An array of electromagnets (not shown in FIG. 5) may be included in Tx/Rx Assembly 514 and arranged around the coil. For example, the array of electromagnets may include one or more electromagnets arranged as described throughout this disclosure. The array may be electrically connected to the power source 508, control unit 512.

Figure 6:
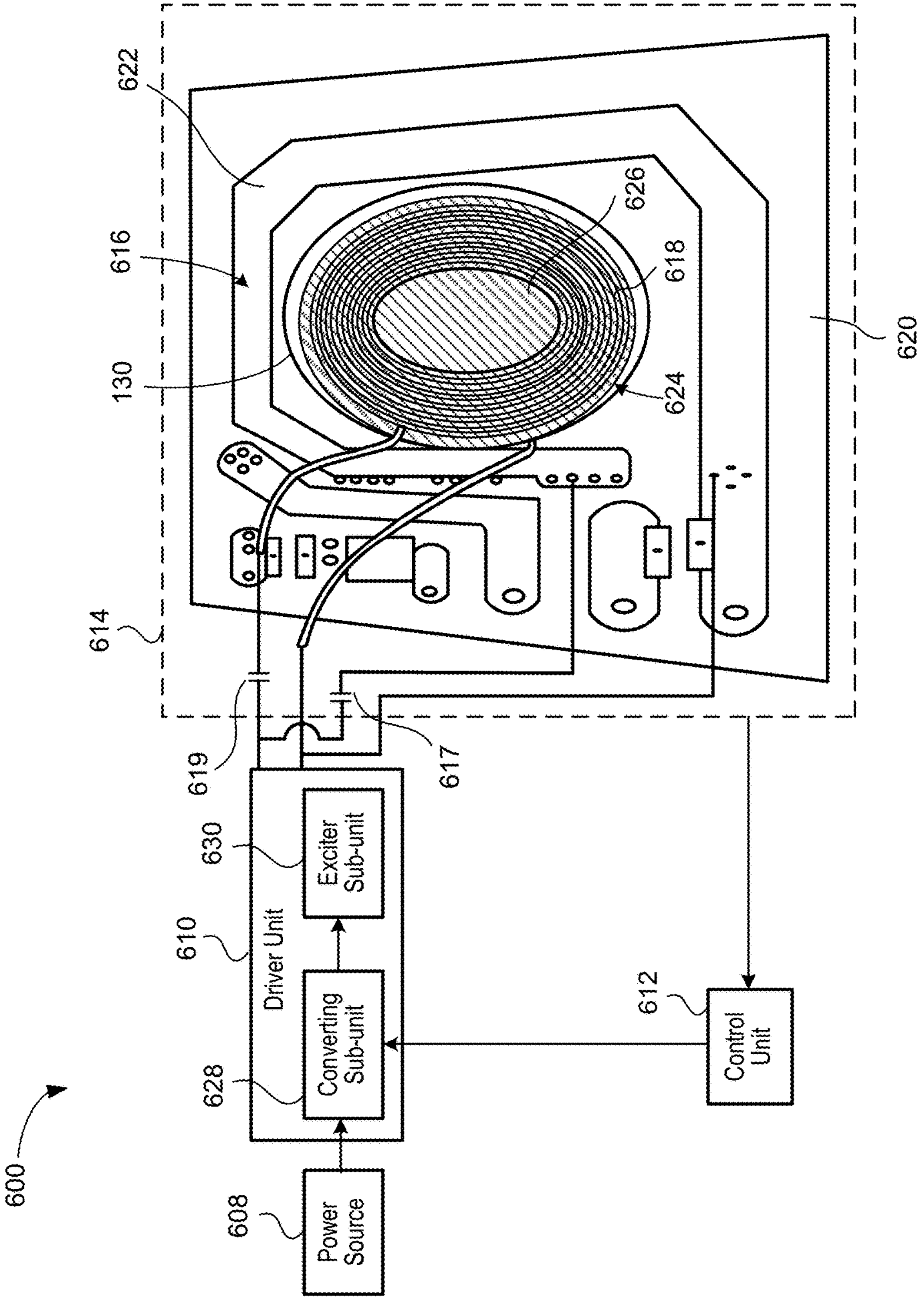
FIG. 6 is another system diagram of a system for wireless power transfer.

The coil may be embedded in a printed circuit board (PCB) (see FIG. 6 for example). The coil may be configured to transmit the first AC voltage signal having a frequency. The first coil may be embedded in the PCB and/or printed on the PCB in the form of one or more electrical conducting tracks. The coil along with the first capacitor may be designed to offer an impendence that is dependent on the AC frequency of operation.

The Tx/Rx assembly 514 may include a shielding unit (not shown) configured to shield one or more components in the wireless charging device 502 from an AC magnetic field associated with at least one AC voltage signal. The components may include the power source 508, the driver and/or rectifier unit, 510, and/or the control unit 512. The AC magnetic field may be generated when the first AC voltage signal flow through the coil 515 of Tx/Rx assembly 514. The shielding unit may be coupled to the first coil 515. The aspect of shielding the components will be described in greater detail with reference to FIG. 7.

As depicted in FIG. 5, the receiver device 504 may include a first receiver coil 520, a first rectifier unit 522, and/or a first load 524. The transmitter device 506 may include a power source 526, a driver unit 528, and a coil assembly 530.

FIG. 6 is another system diagram of a system for wireless power transfer including a universal wireless charging device 600 for transmitting electric power. The example transmitter in FIG. 6 may be configured to operate a different AC frequencies. Although the transmitter operation may be described with respect to FIG. 6, as may be appreciated, the wireless charging device 600 may be configured to operate as a wireless receiver as described with respect to FIG. 5. The universal wireless charging device 600 may be similar to the universal wireless transmitter/receiver device 502 of FIG. S, but the transmitting operation will be described for purposes of brevity. The universal wireless charging device 600 may include a power source 608, a driver unit 610, a control unit 612, and/or a transmitting assembly 614. FIG. 6 is described with reference to the components of FIG. 1.

As depicted in FIG. 6, the transmitting assembly 614 may include a first coil 616, a first capacitor 617, a second coil 618, a second capacitor 619, and/or a printed circuit board (PCB) 620. The PCB 620 may have a thickness in a range from about 1 mm to about 3 mm. The PCB 620 may have a width in a range from about 40 mm to about 100 mm and/or a length in a range from about 40 mm to about 100 mm.

The first coil 616 may be embedded in the PCB 620 and/or configured to transmit a first AC voltage signal having a first frequency. The first coil 616 may be formed by embedding and/or printing one or more electrical conducting tracks 622 along a periphery of the PCB 620. Electrical conducting tracks 622 may have a determined trace width and/or trace thickness that, for example, may aid in minimizing a size of the first coil 616 to transmit the first AC voltage signal. The trace width of the first coil 616 may be in a range from about 0.1 mm to about 10 mm and/or the trace thickness of the first coil 616 may be in a range from about 35 microns and 210 microns. An array 130 may be arranged around the first coil 616 and/or the second coil 618.

For example, the array 130 may include one or more electromagnets as described herein. The array 130 may be electrically connected to the power source 608, control unit 612, and/or driver unit 610.

The electrical conducting tracks 622 along with the first capacitor 617 may be configured to offer low impedance to a high frequency signal, such as the first AC voltage signal to allow electric power transfer from the transmitting assembly 614 to a receiver device using the first AC voltage signal. The electrical conducting tracks 622 along with the first capacitor 617 may be configured to offer a very high impedance to a low frequency signal, such as the second AC voltage signal to block electric power transfer from the transmitting assembly 614 to a receiver device using the second AC voltage signal. The first coil 616 may transmit (e.g., only) the first AC voltage signal having the first frequency to receiver devices, such as the receiver devices 504, 506.

The first coil 616 may be embedded on a plurality of layers (not shown) in the PCB 620. The electrical conducting tracks 622 may be printed on the plurality of layers in the PCB 620. The first coil 616 may be helically disposed across multiple layers in the PCB 620. The first coil 616 may be spirally disposed across one or more layers in the PCB 620. The electrical conducting tracks 622 in each of these layers may be coupled to each other to form a coil structure that is representative of the first coil 616. This coil structure may be used for generating an AC magnetic field (see FIG. 7) that may correspond to the first AC voltage signal. Since the first coil 616 may be printed on and/or embedded within the PCB 620, any variations in one or more parameters associated with the first coil 616 may be controlled to enhance the transmission of the first AC voltage signal, while minimizing/reducing power loss during the transmission of the first AC voltage signal. The parameters associated with the first coil 616 may include a leakage inductance of the coil 616, a leakage capacitance of the coil 616, a resistance of the coil 616, and/or the like.

The second coil 618 may be disposed on the PCB 620 and/or within an aperture 624 of the PCB 620 and configured to transmit the second AC voltage signal having the second frequency. The second coil 618 may be a Litz wire coil that is wound in a desired shape. As previously noted, some non-limiting examples of the desired shape include a circular shape, an elliptical shape, a figure of eight, shape, and/or the like. A thickness of the Litz wire coil 618 may be in a range from about 0.2 mm to about 5 mm.

As noted herein, the first coil 616 may be embedded along the periphery of the PCB 620. The aperture 624 may be located at/about a central portion of the PCB 620 that is away from the periphery of the PCB 620. Accordingly, the first coil 616 that is printed on/embedded within the PCB 620 may surround the aperture 624 in the PCB 620. The second coil 618, in the form of the Litz wire coil for example, may be positioned within the aperture 624 of the PCB 620. Since the second coil 618 may be positioned within the aperture 624 of the PCB 620, use of the real estate on the PCB 620 may be optimized, thereby improving the compactness of the transmitting assembly 614.

The second coil 618 along with the second capacitor 619 may be configured to offer a low impedance to a low frequency signal, such as the second AC voltage signal, for example to allow electric power transfer from the transmitting assembly 614 to a receiver device using the second AC voltage signal. The second coil 618 along with the second capacitor 619 may be configured to offer a high impedance to a high frequency signal, such as for example the first AC voltage signal to block electric power transfer from the transmitting assembly 614 to a receiver device using the second AC voltage signal. The second coil 618 may transmit (e.g., only) the second AC voltage signal having the second frequency to the receiver devices 504, 506. Since the second coil 618 may transmit a low frequency signal, such as the second AC voltage signal, variations in the parameters associated with the second coil 618 may have a low impact on the power transfer capability at the low frequency. As the Litz wire coil may be used as the second coil 618, skin effect losses, eddy current losses, and/or proximity losses in the second coil 618 may be substantially reduced, which additionally, or alternatively, may improve efficiency of transmitting the second AC voltage signal.

The first coil 616 and the second coil 618 may be coplanar and/or concentric to each other. The first coil 616 and the second coil 618 may be positioned adjacent to each other or positioned side-by-side. The first coil 616 may be printed on and/or embedded in one PCB. The second coil 618 may be disposed on another PCB. The design of the transmitting assembly 614 presented herein may aid in reducing the size of the transmitting assembly 614. For example, the first coil 616 may have a desired shape printed on and/or embedded along the periphery of the PCB 620, and/or the second coil 618 may be wound in a desired shape and/or positioned at the center of the PCB 620. The first coil 616 and/or the second coil 618 may be arranged in any desired manner in the transmitting assembly 614, and are not limited to the structure depicted in FIG. 6.

The transmitting assembly 614 may include a shielding unit 626. The shielding unit 626 may be positioned beneath the first coil 616 and/or the second coil 618. The shielding unit 626 may be used to shield the components of the universal wireless charging device 600, such as the driver unit 610, the control unit 612, and/or the power source 608 from the AC magnetic field generated by the first and/or second coils 616, 618. The aspect of shielding the components is described in greater detail with reference to FIG. 7.

The driver unit 610 may include a converting sub-unit 628 and/or an exciter sub-unit 630 that may be electrically coupled to each other. The converting sub-unit 628 may be configured to generate the first AC voltage signal having the first frequency and the second AC voltage signal having the second frequency. The converting sub-unit 628 may include a full-bridge circuit, a half-bridge circuit, or a combination thereof (not shown). The converting sub-unit 628 may be electrically coupled to the control unit 612 and the power source 608.

The control unit 612 may be configured to generate a first control signal and/or a second control signal. The driver unit 610 may be configured to receive a DC voltage signal, for example from the power source 608. The driver unit 610 may be configured to use the DC voltage signal and/or generate a first AC voltage signal and/or a second AC voltage signal, for example in response to receipt of the first control signal or the second control signal from the control unit 612. If the driver unit 610 receives the first control signal from the control unit 612 for example, the converting sub-unit 628 may be configured to convert the DC voltage signal to the first AC voltage signal having the first frequency. If the driver unit 610 receives the second control signal from the control unit 612 for example, the converting sub-unit 628 may be configured to convert the DC voltage signal to the second AC voltage signal having the second frequency. The converting sub-unit 628 may be a single converter that is electrically coupled to the power source 608 and/or configured to receive the DC voltage signal from the power source 608. The term single converter may refer to an electrically coupled device that has a single DC input. A single converter may convert the DC voltage signal to the first AC voltage signal, for example having the first frequency and/or the second AC voltage signal having the second frequency. In some charging devices, a dedicated converter for each frequency standard may be employed to transmit the electric power to the corresponding receiver device. However, using separate converters for each frequency standard may (e.g., substantially) increase costs associated with the set-up and maintenance of the conventional power transfer systems. In the wireless charging device 600, the single converter may be used to transmit electric power to the receiver devices having same or different frequency standards. The exciter sub-unit 630 may be optional and/or may include filter elements for impedance matching purpose for effective transmission of wireless power.

The converting sub-unit 628 may be (e.g., directly) coupled to the transmitting assembly 614. The converting sub-unit 628 may be (e.g., directly) coupled to the transmitting assembly 614 via one or more electric cables. The converting sub-unit 628 may be configured to directly transmit the first AC voltage signal and the second AC voltage signal to the transmitting assembly 614, for example in the absence of the exciter sub-unit 630. The first coil 616 in the transmitting assembly 614 may be electrically coupled to the converting sub-unit 628 and/or inductively coupled to the receiver device 504. If the first AC voltage signal having the first frequency is generated by the converting sub-unit 628 for example, the first coil 616 may be excited by the first AC voltage signal to transmit the first AC voltage signal having the first frequency to the receiver device 504

The second coil 618 in the transmitting assembly 614 may be electrically coupled to the converting sub-unit 628 and/or inductively coupled to the second receiver device 506. If the second AC voltage signal 516 having the second frequency is generated by the converting sub-unit 628 for example, the second coil 618 may be excited by the second AC voltage signal, for example to transmit the second AC voltage signal having the second frequency to the second receiver device 506.

During operation of the universal wireless charging device 600 for example, the control unit 612 may generate the first control signal and/or the second control signal. The control unit 612 may generate the first control signal and/or the second control signal based on user input data and/or any change in characteristics, such as for example electrical current, voltage, and/or impedance of the transmitting assembly 614. The control unit 612 may transmit the first control signal and/or the second control signal to the driver unit 610.

If the driver unit 610 receives the first control signal for example, the converting sub-unit 628 in the driver unit 610 may convert the DC voltage signal to the first AC voltage signal having the first frequency. The converting sub-unit 628 may transmit the first AC voltage signal having the first frequency to the transmitting assembly 614. The first coil 616 and the first capacitor 617 in the transmitting assembly 614 may be excited at the first frequency to generate the AC magnetic field corresponding to the first AC voltage signal, for example subsequent to the receipt of the first AC voltage signal having the first frequency by the transmitting assembly 614. A receiver coil such as the first receiver coil 520 in the receiver device 504 for example, may receive this AC magnetic field inducing a first AC voltage signal in its coil. A rectifier unit such as the first rectifier unit 522 in the receiver device 504 for example, may rectify this first AC voltage signal to a first DC voltage signal. The first DC voltage signal may be used for charging a load such as the first load 524 in the receiver device 504.

If the driver unit 610 receives a control signal from the control unit 612 for example, the converting sub-unit 628 in the driver unit 610 may convert the DC voltage signal to the AC voltage signal having the second frequency. The converting sub-unit 628 may transmit the AC voltage signal having an associated frequency to the transmitting assembly 614. The second coil 618 and/or the second capacitor 619 in the transmitting assembly 614 may be excited at the associated frequency to generate the AC magnetic field corresponding to the AC voltage signal having the associated frequency, for example subsequent to the receipt of the AC voltage signal having the associated frequency by the transmitting assembly 614. A receiver coil such as the first receiver coil 520 in the receiver device 504 for example, may receive this AC magnetic field and/or convert this AC magnetic field back to the AC voltage signal. A rectifier unit such as the first rectifier unit 522 in the receiver device 504 for example, may rectify this AC voltage signal to an associated DC voltage signal. The associated DC voltage signal may be used for charging a load such as the first receiver coil 520 in the receiver device 504 for example.

Figure 7:
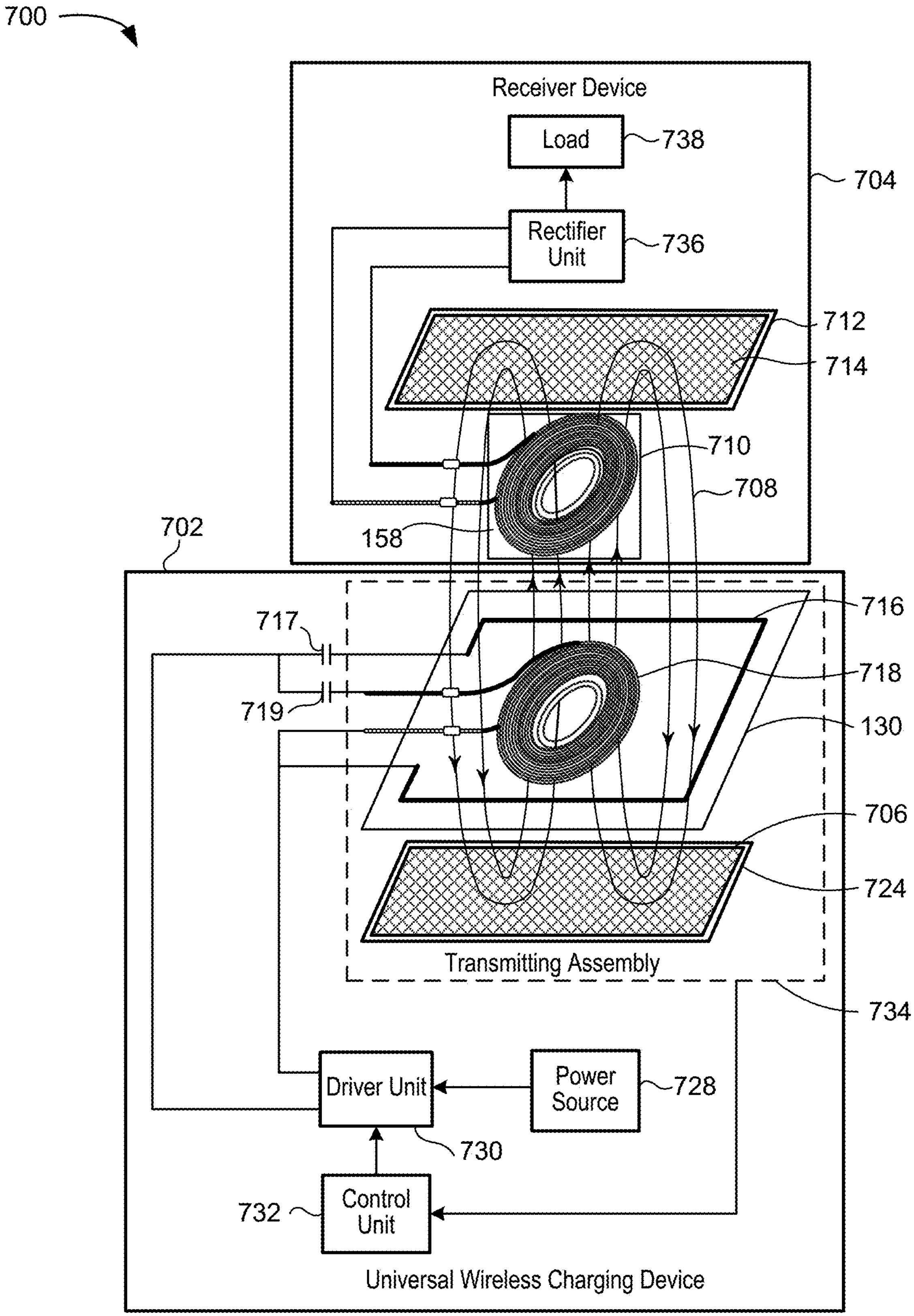
FIG. 7 is a system diagram of an apparatus configured to operate in a power transmitter mode and/or a power receiver mode and a peer power receiver device.

FIG. 7 is a system diagram of an apparatus 700 configured to operate in a power transmitter mode and/or a power receiver mode and a peer power receiver device. The apparatus (e.g., wireless power transfer system) 700 may include a universal wireless transmitter/receiver device 702 and a receiver device 704. For purposes of brevity, the transmitter side operation of universal transmitter/receiver device 702 will be described with respect to FIG. 7, but as described with respect to FIG. 5, universal transmitter/receiver device 702 may also be configured to operate in a receiver mode of operation. When operating in receiver mode, the transmitter/receiver device 702 may include the components and/or perform the functions as described with respect to receiver device 704. The universal wireless charging device 702 may be similar to the universal wireless charging device 600 of FIG. 6 and/or universal transmitter/receiver device 502 of FIG. 5.

The universal wireless charging device 702 may include a power source 728, a driver unit 730, a control unit 732, and/or a transmitting assembly 734. The transmitting assembly 734 may include a first coil 716, a first capacitor 717, a second coil 718, and/or a second capacitor 719. Additionally, the universal charging device 702 may include a shielding unit 724 having a ferrite layer 706.

The receiver device 704 may include a rectifier unit 736 and/or a load 738. Additionally, or alternatively, the receiver device 704 may include a receiver coil 710 and/or a shielding unit 712 having a ferrite layer 714. The shielding unit 724 may be operatively coupled to at least one of the first coil 716 and the second coil 718 and/or configured to shield one or more components in the wireless power transfer system 700 from an AC magnetic field 708 generated by at least one of the first coil 716 and the second coil 718 in the transmitting assembly 734. The shielding unit 724 may increase the coupling between the transmitting assembly 734 and the receiving device 704, for example by enhancing magnetic coupling of the first and/or second coils 716, 718 in the transmitting assembly 734 with the receiver coil 710 in the receiver device 704. The AC magnetic field 708 may be generated, for example, when a first AC voltage signal and/or a second AC voltage signal respectively is applied to the first coil 716 and/or the second coil 718. The shielding unit 724 may be positioned beneath the first coil 716 and/or the second coil 718. An array 130 may be arranged around the first coil 716 and/or the second coil 718. For example, the array 130 may include one or more electromagnets as described herein. The array 130 may be electrically connected to the power source 728 and the control unit 732.

The AC magnetic field 708 generated by the coils 716, 718 may induce eddy current loops in conductive components such as for example the power source 728, the driver unit 730, and/or the like. The eddy current loops may result in generation of heat in these conductive components. The magnetic and/or inductive coupling between the coils 716, 718 in the transmitting assembly 734 and the receiver coil 710 in the receiver device 704 may result in the eddy current loops in these conductive components in the universal wireless charging device 702. This may result in power loss and electromagnetic interference (EMI) issues in the universal wireless charging device 702. The shielding unit 724 may prevent any negative impact on these conductive components in the universal wireless charging device 702, for example due to the AC magnetic field 708, thereby preventing these conductive components from damage. An array 158 may be arranged around the receiver coil 710. For example, the array 158 may include one or more electromagnets as described herein. The array 158 may be electrically connected to the power source in the receiver, and/or a control unit in the receiver.

The shielding unit 724 may include the ferrite layer 706 that may be configured to reduce reluctance of the AC magnetic field 708 associated with at least one of the first AC voltage signal and the second AC voltage signal. This reduction in the reluctance of the AC magnetic field 708 may aid in enhancing the magnetic coupling of at least one of the first coil 716 and the second coil 718 with the receiver coil 710 in the receiver device 704. The ferrite layer 706 may provide greater permeability to the AC magnetic field 708, for example as compared to the air around the coils 716, 718. The ferrite layer 706 may be used to influence the AC magnetic field 708, for example to improve transmission efficiency and/or magnetic coupling of the coils 716, 718 with the receiver device 704. The AC magnetic field 708 may be restricted from impacting the conductive components in the universal wireless charging device 702, for example by positioning the ferrite layer 706 beneath the coils 716, 718. Eddy current losses and proximity losses of the first AC voltage signal and the second AC voltage signal may be significantly reduced.

Another shielding unit 712 may additionally, or alternatively, be positioned in the receiver device 704, for example to shield one or more conductive components in the receiver device 704 from the AC magnetic field 708 at the receiver device 704. The shielding unit 712 may have a ferrite layer 714 positioned above the receiver coil 710, for example to prevent the AC magnetic field from affecting the conductive components, such as the rectifier unit 736 and the load 738 in the receiver device 704.

Although not explicitly shown in FIG. 5-7, in order to aid in aligning the primary coil of a transmitter device and the secondary coil of a receiver device, magnet arrays may be positioned around the primary coil of the transmitter device and/or around the secondary coil of the receiver device. As described with respect to FIG. 3, the magnets of the receiver device may be configured to have the opposite polarity as the magnets of the transmitter device. In this manner, the magnets may be configured to attract the transmitter to the receiver in such a way so as to align the primary coil of the transmitter with the secondary coil of the receiver in an attempt to maximize the coupling between the devices. To allow a device to operate as both a power receiver and a power transmitter, the array may be composed of electromagnets that allow for various configurations of the pole positions within the array. In this manner, the device may utilize a first magnetic configuration when operating in a transmitting mode and a second magnetic configuration in a receiving mode. In another example, the use of the electromagnets may allow a device to use different magnetic configurations for alignment based on different magnetic configurations of peer devices. For example, a first receiver may have a first magnetic configuration and a second receiver may have a second magnetic configuration that is different from the first magnetic configuration. When the device including the electromagnet array attempts to align with the first receiver, the electromagnet array may be controlled to generate a first reciprocal magnetic configuration. When the device including the electromagnet array attempts to align with the second receiver, the electromagnet array may be controlled to generate a second reciprocal magnetic configuration. In this manner, the device may be used to transmit power to different receiver devices having different magnetic alignment configurations and the electromagnet array can be used to facilitate alignment with the different receivers.

Described below are various configurations of the electromagnet array. These different configurations may be used to generate varying magnetic pole arrangements in order to attract the magnet used for coil alignment at a peer device. Current may be supplied to the electromagnets in order to vary the pole configurations. For example, an electromagnet may be comprised of a ferrite material and a coil around the ferrite material. When a DC current is applied to the coil, the electromagnet may create a North (N) pole in a first direction and a South (S) pole in a second (e.g., opposite) direction. When the DC current is applied in a second (e.g., opposite) direction, then the electromagnet may create a South (S) pole in a first direction and a North (N) pole in a second (e.g., opposite) direction. In this manner, by controlling which electromagnets are powered and the direction of the current applied to the coils of the electromagnets in the array, different arrangements of N/S poles can be generated in order to form a magnetic arrangement suite to attack a peer device of various (e.g., reciprocal) magnetic arrangements.

Figure 8:
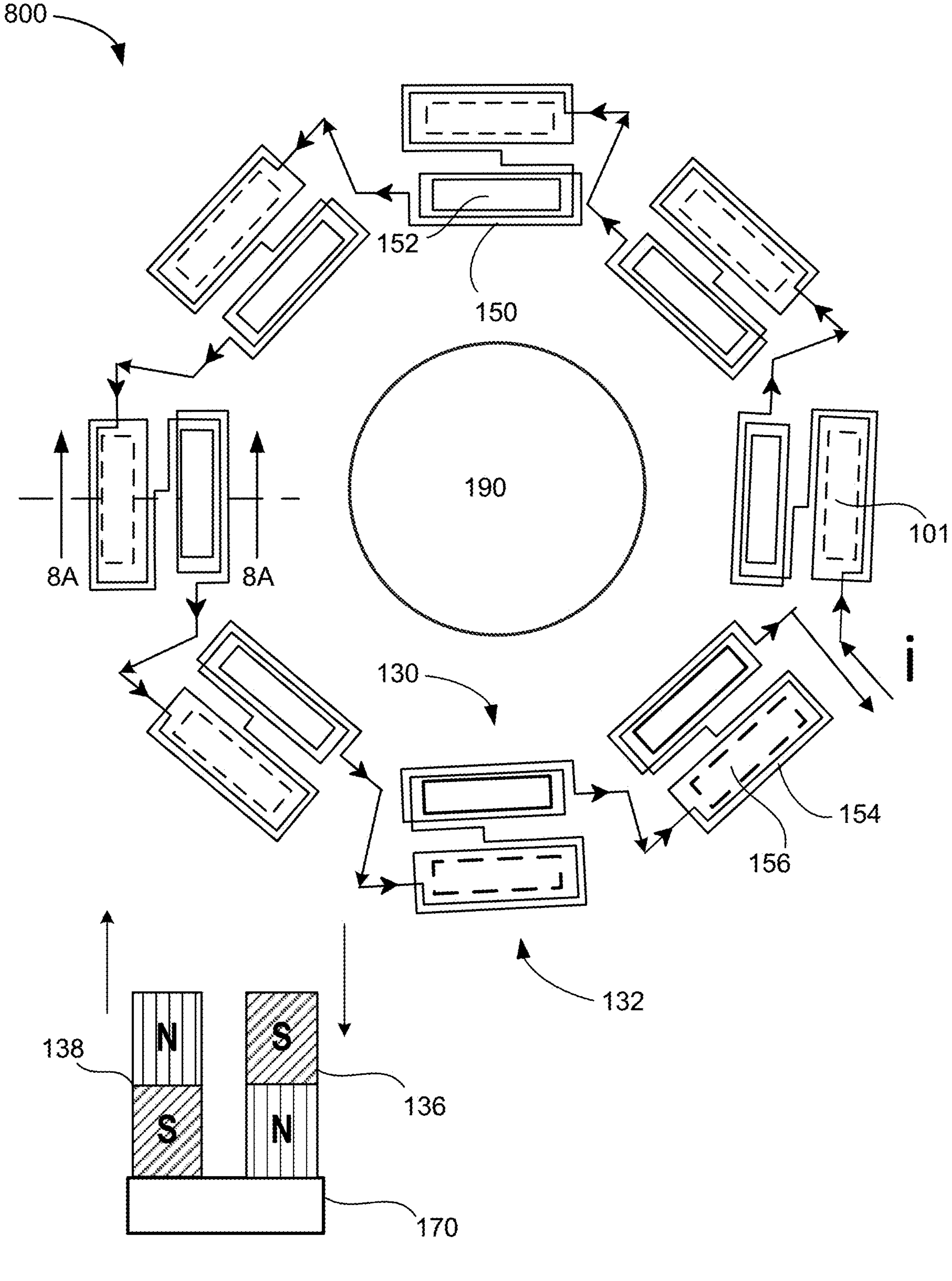
FIG. 8 is an example of an electromagnet array that facilitates alignment of a power transmitter with a peer power receiver device.

FIG. 8 is an example of an electromagnet array 800 that may be used with a wireless transmitter and/or receiver device. The array 800 may include a plurality of electromagnets. The plurality of electromagnets may include an inner array 130 of electromagnets and an outer array 132 of electromagnets. Each of the electromagnets in the inner array 130 may include respective coils 150 around respective ferrites 152. The respective coils 150 around respective ferrites may be configured to generate a first pole direction 136 when a current (e.g., i) is applied to the inner array 130 of electromagnets. For example, the coils 150 may be disposed in a first coil direction around respective ferrites. The first coil direction may be clockwise. The first pole direction 136 may be arranged such that the south pole is proximate a surface 101 of the array 100. A high permeable material 170 may be disposed adjacent to the inner array 130 and/or the outer array 132. The high permeable material 170 may be adjacent to the north pole of the first pole direction 136. In order to illustrate the polarity of the magnetic fields generated by the electromagnets under various current conditions and coil arrangements, in the Figures ferrites shown in solid lines generate a north pole in a first direction and a south pole in a second (e.g., opposite) direction. Similarly, in the Figures ferrites shown in broken/hashed lines generate a south pole in the first direction and a north pole in a second (e.g., opposite) direction. The first pole direction 136, the second pole direction 138, and the high permeable material are shown taken along line 8A-8A.

Each of the electromagnets in the outer array 132 may include respective coils 154 around respective ferrites 156. The respective coils 154 around respective ferrites 156 may be configured to generate a second pole direction 138 when a current (e.g., i) is applied to the outer array 132 of electromagnets. For example, the coils 154 may be disposed in a second coil direction around respective ferrites 156. The second coil direction may be counterclockwise. The second pole direction 138 may be arranged such that the north pole is proximate the surface 101 of the array 100. The high permeable material 170 may be adjacent to the south pole of the second pole direction 138. In this manner the inner array may generally create a ring of south pole magnet portions and the outer array may create a ring of North pole portions. As such, the inner array is shown with a solid line, while the outer array is shown by broken/hashed lines. By having north pole portions on the exterior of the array and south pole portions on the interior of the array, the electromagnet may be configured to attract a receiver having the magnetic configuration shown at 110 of FIG. 3 (e.g., by creating the magnetic arrangement 100 of FIG. 3). A control unit (not shown) that controls the current supplied to the electromagnets may be configured to supply the current to electromagnets such that it results in the magnetic arrangement shown in FIG. 8 when the device is operating a transmitter mode of operation (e.g., when the device is aligning with a power receiver). Poles in the inner and outer array electromagnets may reverse when the current 'I' is reversed (e.g., when the current direction is reversed).

The array 800 may be arranged around one or more power transfer coil 190. The power transfer coil 190 may be configured to transfer power to a peer device and/or receive power from a peer device. One or more of the electromagnets (e.g., the ferrite(s) and/or the coil(s)) in the array may be at least partially disposed in the same substrate and/or printed circuit board (PCB). Additionally, or alternatively, the power transfer coil may be at least partially disposed in the (e.g., same) substrate and/or PCB. For example, the peer device may receive power at a peer power transfer coil in the peer device. The peer device may include at least a power transfer coil, for example as in FIG. 9.

Figure 9:
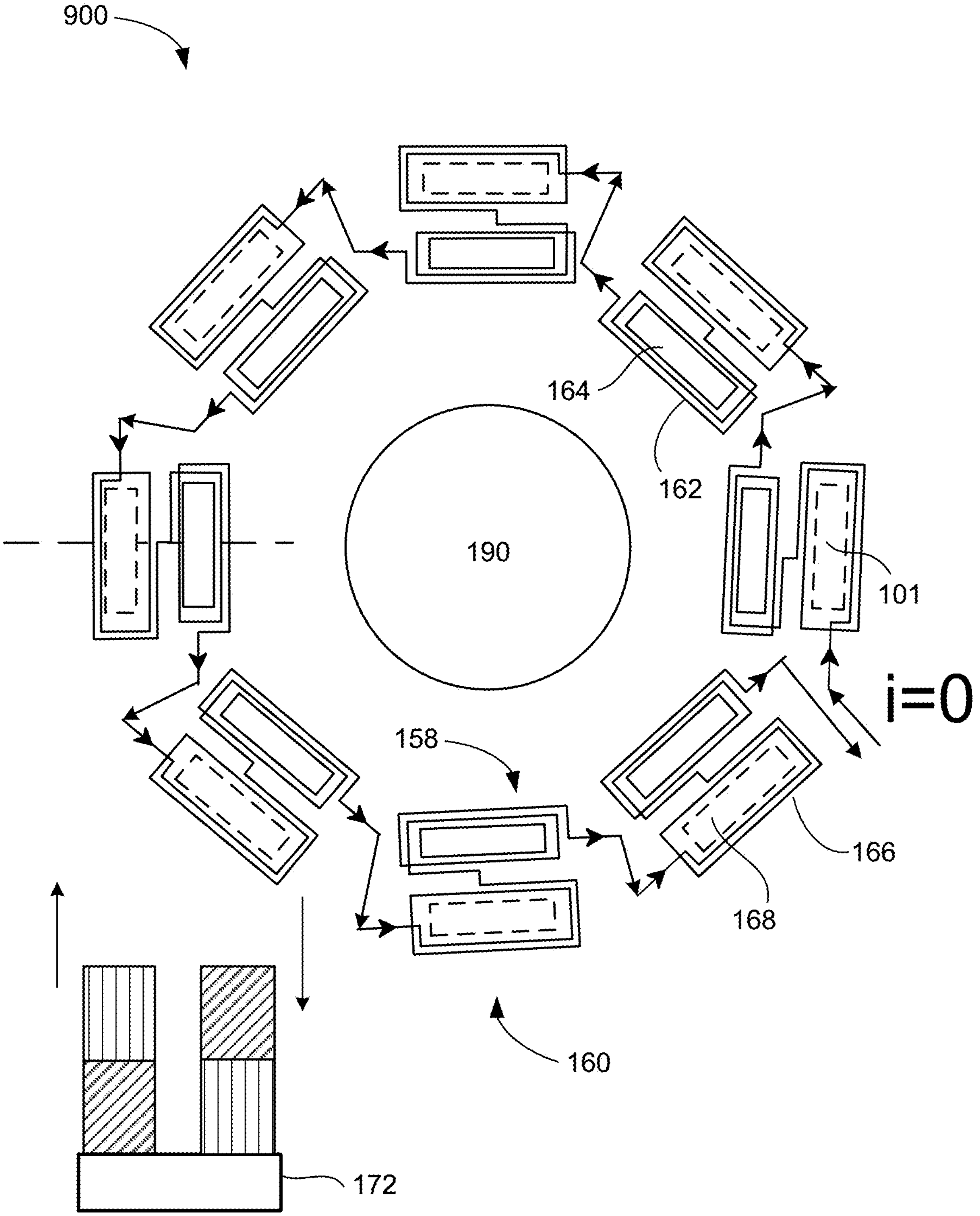
FIG. 9 is an example of an electromagnet array that is not powered, for example when the array is being used in a device in power receiver mode.

FIG. 9 is an example where the electromagnet array 900 is not supplied with a current. For example, the control unit may determine that the device is operating in a power receiver mode of operation (e.g., is aligning with a power transmitter). In this example, no current may be supplied to the electromagnets in the array 100. The plurality of electromagnets may include an inner array 158 of electromagnets and an outer array 160 of electromagnets. Each of the electromagnets in the inner array 158 may include respective coils 162 around respective ferrites 164. The coils 162 of the inner array may be around ferrites 164 in a first (e.g., clockwise) direction. Although no current is applied to the array 100, the ferrites may still provide a mild attraction to a magnetic array at a transmitter device. Additionally, by not applying any power to the array 100 while the device is operating in a power receiver mode of operation, power may be conserved during periods where the device has little to no remaining power in its battery units. A high permeable material 172 may be disposed adjacent to the inner array 158 and/or the outer array 160. The coils 166 may be disposed in a second coil direction around respective ferrites 168. The second coil direction may be counterclockwise.

The array 900 may be arranged around one or more power transfer coil 190. The power transfer coil 190 may be configured to receive power from a peer device and/or transfer power to a peer device. For example, the power transfer coil 190 may receive power from a peer power transfer coil in the peer device. The peer device may include at least a power transfer coil, for example as in FIG. 8. Although the electromagnetic array is not supplied with a current to create magnetic poles, in some cases, for example when the receiver is at a sufficient good charge, a current may be supplied to the arrays to create magnetic poles in a direction to enhance attraction with a similar array in the transmitter for alignment.

Figure 10:
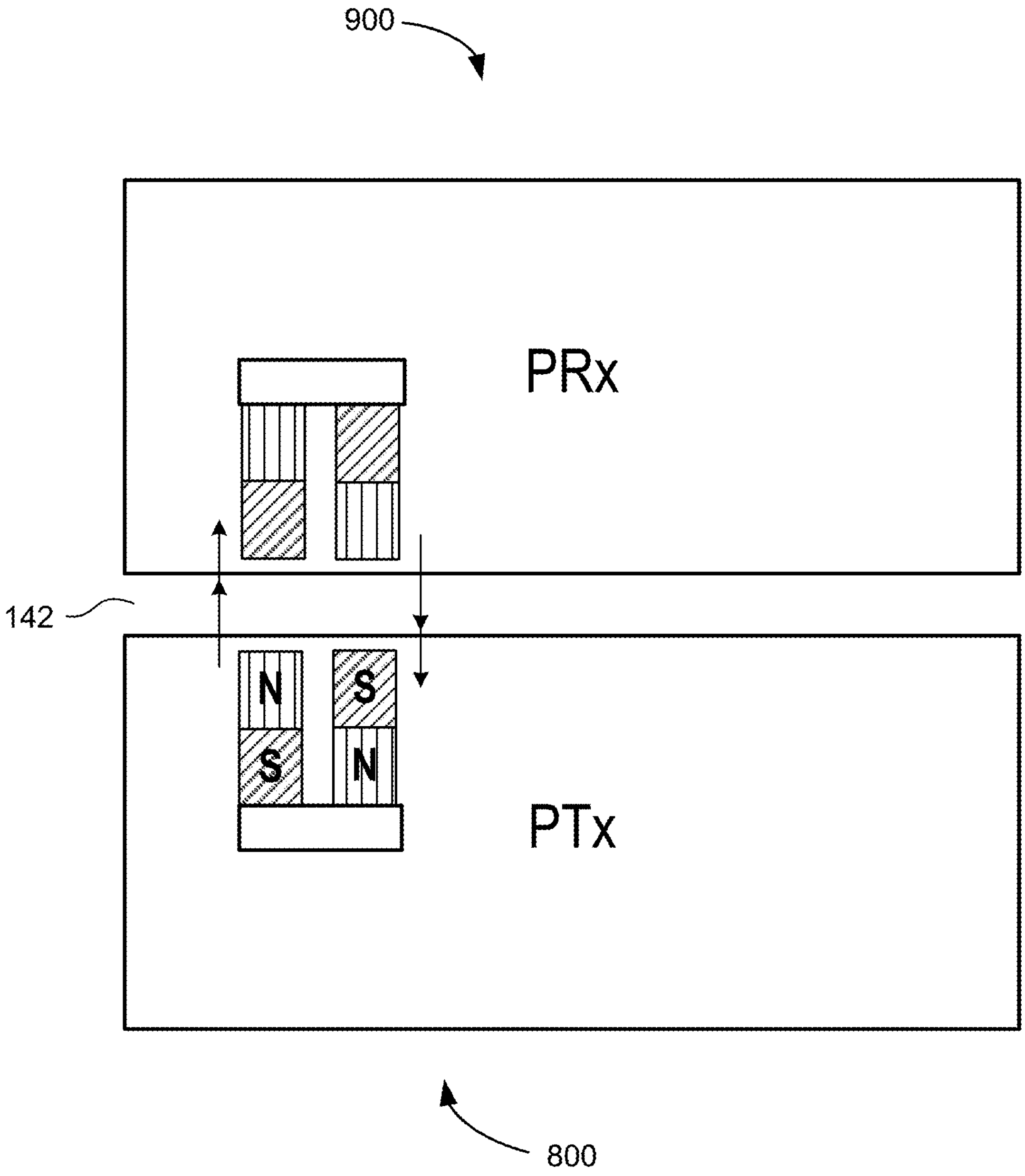
FIG. 10 is a view of an example system with an example transmitter magnetic alignment in accordance with FIG. 8 and an example receiver magnetic alignment in accordance with FIG. 9.

FIG. 10 is a view of an example system with an example demonstrating the alignment of the transmitter mode of operation with array 800 (FIG. 8) being aligned with the receiver mode of operation with array 900 (FIG. 9) The array 800 associated with the transmitter mode and array 900 associated with the receiver mode may be separated by an air gap 142. The electromagnetic configuration of array 800 associated with the transmitter mode may attract the ferrites in the array 900 associated with the receiver mode of operation in order to align the primary coil of the transmitter with the secondary coil of the receiver.

In another example, as mentioned herein for example, current may be applied when the device is in the receiver mode of operation. However, the DC current may be applied in the opposite direction as when in the transmitter mode of operation. In this manner, the poles created by the electromagnets may be in the opposite direction as in the transmitter configuration. In this manner, the receiver mode of operation would attract the transmitter mode of operation based on their opposite pole configurations.

Figure 11:
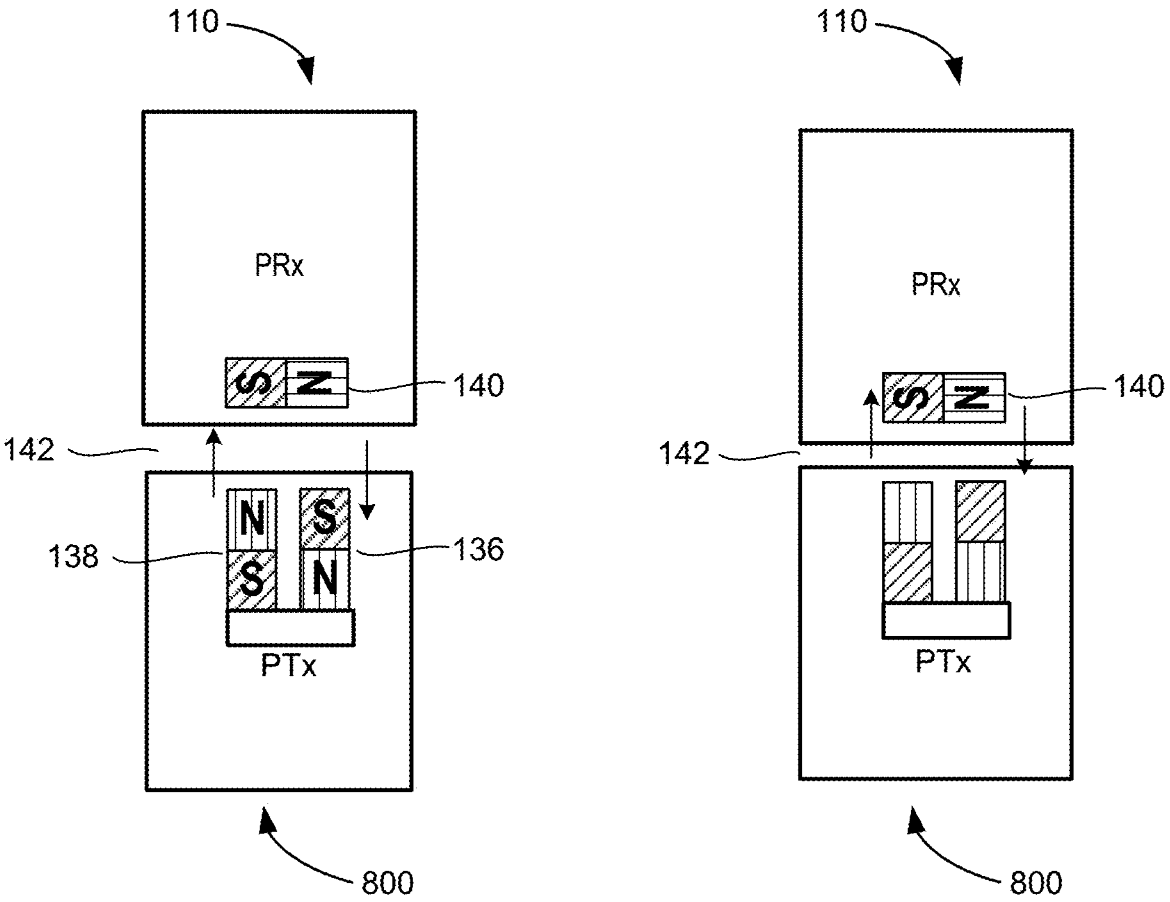
FIG. 11 is a view of an example of the electromagnet array of FIG. 8 being aligned with an example receiver with a receiver magnet configuration.

FIG. 11 is a view of an example system with an example array 800 associated with the transmitter mode in accordance with FIG. 8 and an example receiver in accordance with FIG. 3. The pole direction 140 may be arranged such that the south pole is oriented proximate a north pole of the second pole direction 138 and/or the north pole is oriented proximate a south pole of the first pole direction 136 of the array 800. The array 800 associated with the transmitter mode and the array 110 associated with the receiver mode are shown in alignment with an air gap 142 between the pole direction 140 and pole directions 136, 138. The array 800 associated with the transmitter mode and the array 110 associated with the receiver mode is shown aligned. If no current is applied to the inner array 130 and/or the outer array 132 of the transmitter 100, the magnetic field from the receiver 110 will still latch to the transmitter 100, however, the latch may not be as strong as the latch between the array 800 associated with the transmitter mode and the array 110 associated with the receiver mode while a current is applied to the inner array 130 and/or outer array 132 of the transmitter. This is due to the weaker magnetic field created only by the PRx array and/or by the mere presence of the ferrites in the electromagnet array.

Figure 12:
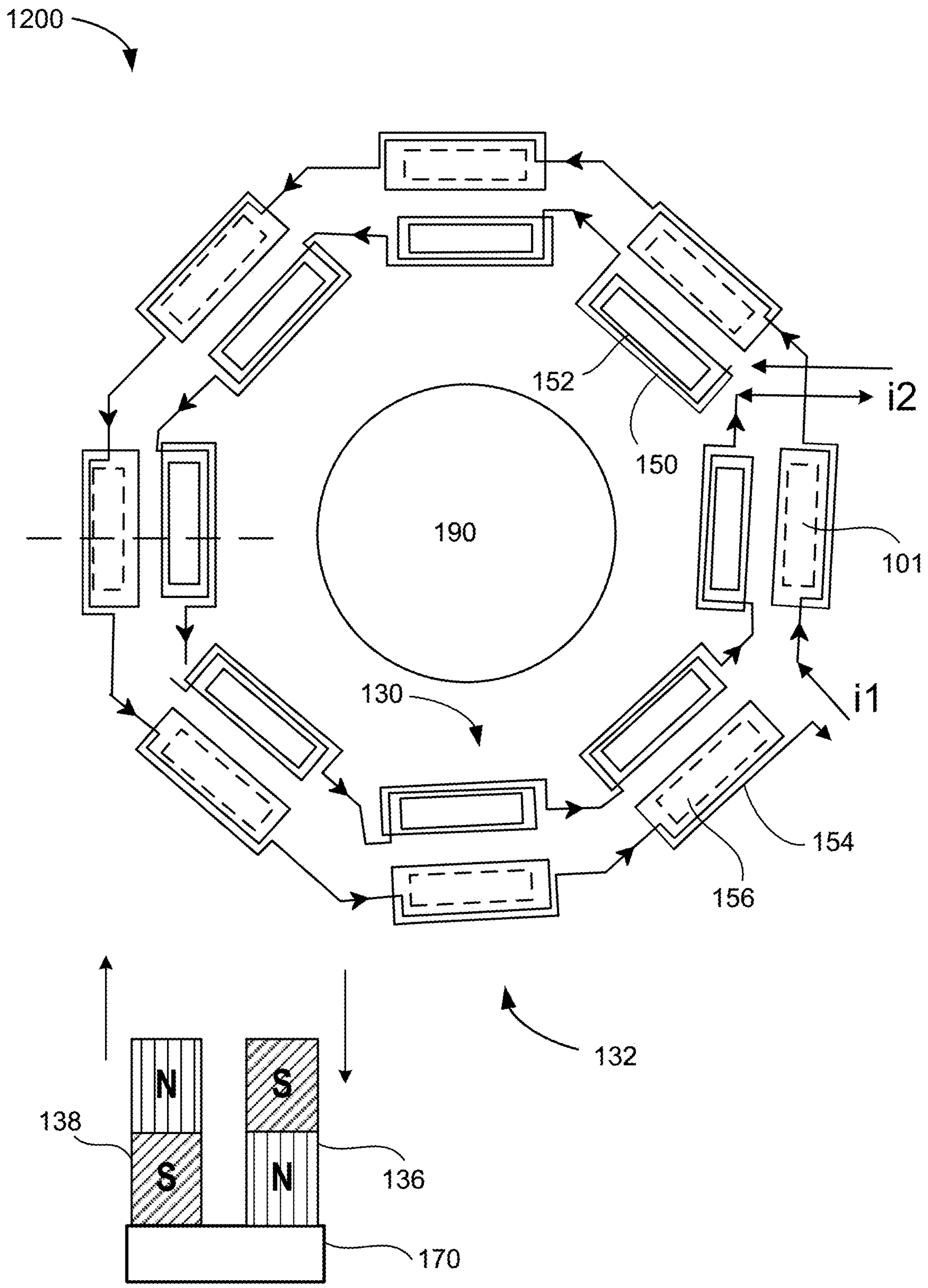
FIG. 12 is another example of an electromagnet array that facilitates alignment of a power transmitter with a peer power receiver device.

FIG. 12 is a view of another example an electromagnet array 1200. The array 1200 may include a plurality of electromagnets. The plurality of electromagnets may include an inner array 130 of electromagnets and an outer array 132 of electromagnets. Each of the electromagnets in the inner array 130 may include respective coils 150 around respective ferrites 152. The respective coils 150 around respective ferrites may be configured to generate a first pole direction 136 when a current (e.g., i2) is applied to the inner array 130 of electromagnets. The respective coils 150 may be in series and/or may be configured to be energized separately from respective coils 154 around respective ferrites 156 in the outer array 132. Coils 150 may be disposed in a first coil direction around respective ferrites. The first coil direction may be clockwise. The first pole direction 136 may be arranged such that the south pole is proximate a surface 101 of the array 1200. A high permeable material 170 may be disposed adjacent to the inner array 130 and/or the outer array 132. The high permeable material 170 may be adjacent to the north pole of the first pole direction 136.

The respective coils 154 around respective ferrites 156 in the outer array 132 may be configured to generate a second pole direction 138 when a current (e.g., i1) is applied to the outer array 132 of electromagnets. The respective coils 154 may be in series and/or may be configured to be energized separately from respective coils 150 around respective ferrites 152 in the inner array 130. Coils 154 may be disposed in a second coil direction around respective ferrites 156. The second coil direction may be counterclockwise. The second pole direction 138 may be arranged such that the north pole is proximate the surface 101 of the array 1200. The high permeable material 170 may be adjacent to the south pole of the second pole direction 138. The array 1200 may be arranged around one or more power transfer coil 190 as described herein. It may be noted that the currents i2 and i1 may be of the same magnitude or of different magnitudes, including zero. For example, in some cases, the magnitude of i2 can be zero, i.e. the flux to aid alignment is not produced by the inner array of electromagnets. Whereas, i1 alone may be passed to create the alignment flux in the outer array of electromagnets.

Figure 13:
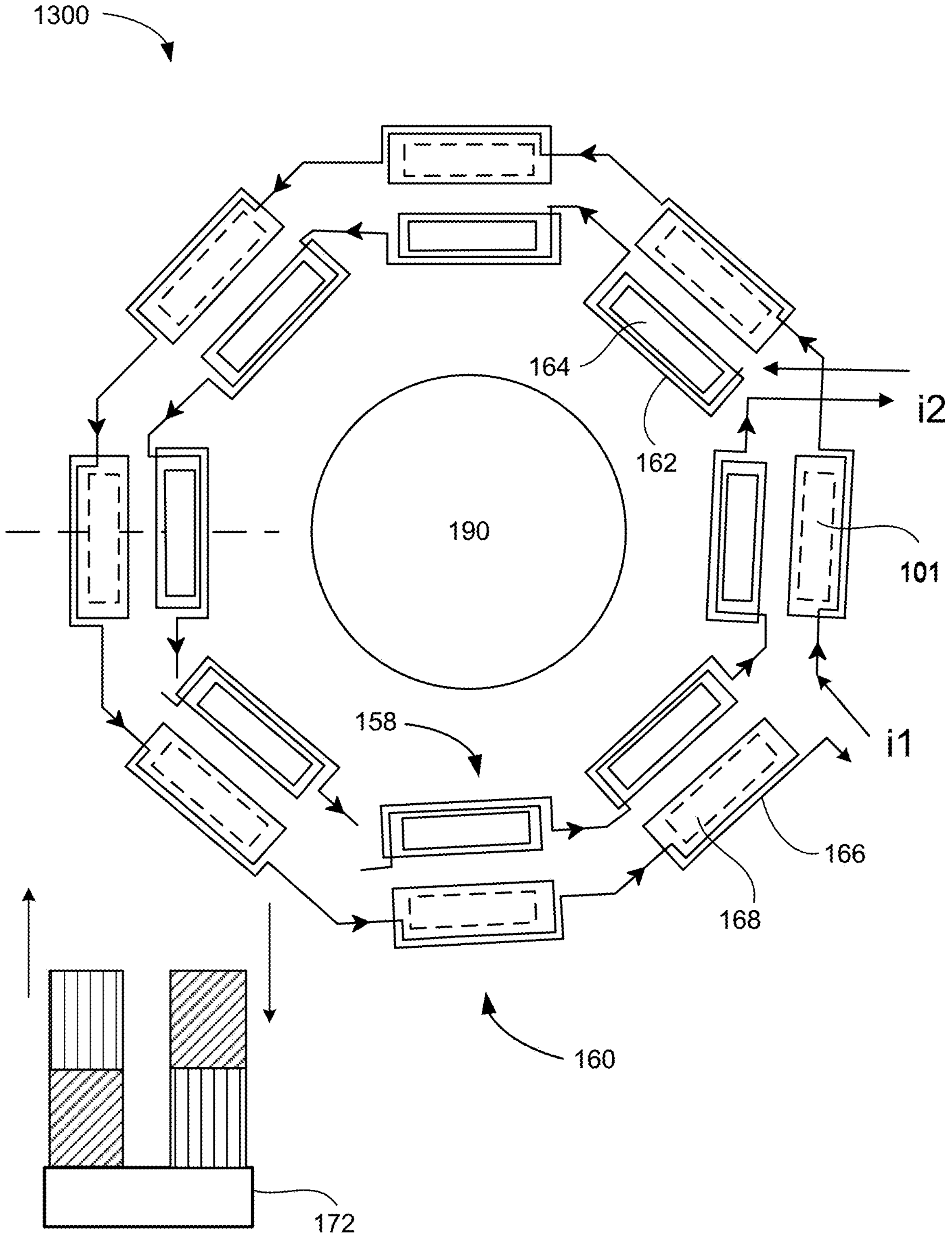
FIG. 13 is another example of an electromagnet array that is not powered, for example when the array is being used in a device in power receiver mode.

FIG. 13 is a view of another example array 1300 when the device is operating in the receiver mode of operation. The array 1300 may include a plurality of electromagnets, but in this example, no power is applied to the array 1300 when the device is operating in receiver mode. The plurality of electromagnets may include an inner array 158 of electromagnets and an outer array 160 of electromagnets. Each of the electromagnets in the inner array 158 may include respective coils 162 around respective ferrites 164. The respective coils 162 may be in series and/or may be configured to be energized separately from respective coils 166 around respective ferrites 168 in the outer array 160. For example, the coils 162 may be disposed in a first coil direction around respective ferrites 164. The first coil direction may be clockwise. A high permeable material 172 may be disposed adjacent to the inner array 158 and/or the outer array 160.

Each of the electromagnets in the outer array 160 may include respective coils 166 around respective ferrites 168. The respective coils 166 may be in series and/or may be configured to be energized separately from respective coils 162 around respective ferrites 164 in the inner array 158. Coils 166 may be disposed in a second coil direction around respective ferrites 168. The second coil direction may be counterclockwise. The array 1300 may be arranged around one or more power transfer coil 190 as described herein.

Although shown as not energized in FIG. 13, in some receiver modes of operation the inner coil may be power using current i2 such that the current direction is in the opposite mode of operation as when the current is in the transmitter mode of operation. Similarly, in some receiver modes of operation the outer coil may be powered using current i1 such that the current direction is in the opposite mode of operation as when the current is in the transmitter mode of operation. In this manner, the polarity of each of the inner and outer coil is opposite that generated in transmitter mode of operation shown in FIG. 12 (e.g., the inner array generates a north pole and the outer array generates a south pole). In another example, one of the inner or outer array may be powered, while no current is applied to the other array. Such an arrangement may still facilitate alignment while limiting the amount of power utilized by the electromagnets.

Figure 14:
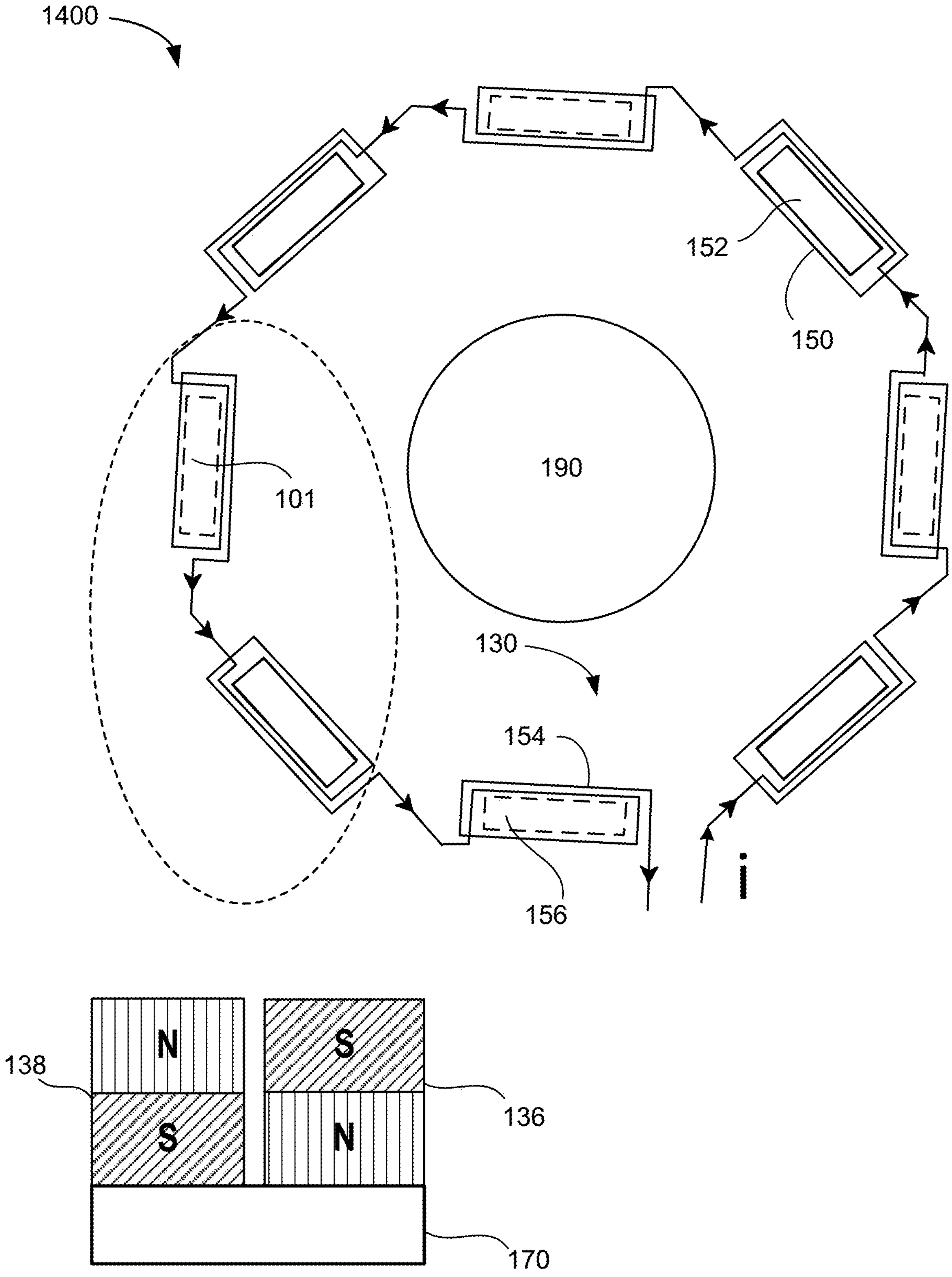
FIG. 14 is another example of an electromagnet array that facilitates alignment of a power transmitter with a peer power receiver device.

FIG. 14 is a view of another example array 1400. The array 1400 may include a plurality of electromagnets. However, in the example shown in FIG. 14, the array 1400 of the plurality of electromagnets may include a single array 130 of electromagnets. The array 130 may include first respective coils 150 around first respective ferrites 152. The first respective coils 150 around first respective ferrites may be configured to generate a first pole direction 136 when a current (e.g., i) is applied to the array 130 of electromagnets. First coils 150 may be disposed in a first coil direction around first respective ferrites. The first coil direction may be clockwise. The first pole direction 136 may be arranged such that the south pole is proximate a surface 101 of the array 1400. A high permeable material 170 may be disposed adjacent to the inner array 130 and/or the outer array 132. The high permeable material 170 may be adjacent to the north pole of the first pole direction 136.

The array may additionally, or alternatively, include second respective coils 154 around second respective ferrites 156. Second respective coils 154 around second respective ferrites 156 may be configured to generate a second pole direction 138 when a current (e.g., i) is applied to the array 130 of electromagnets. Second coils 154 may be disposed in a second coil direction around second respective ferrites 156. The second coil direction may be counterclockwise. The second pole direction 138 may be arranged such that the north pole is proximate the surface 101 of the array 1400. The array 130 may include alternating first ferrites 152 (e.g., with first coils 150) and second ferrites 156 (e.g., with second coils 154). In this manner alternating pole directions may be generated by the different electromagnets in the array 1400. The high permeable material 170 may be adjacent to the south pole of the second pole direction 138. The array 1400 may be arranged around one or more power transfer coil 190 as described herein. It may be noted that depending upon the strength of attraction to the peer device, the direction of current and hence the direction of poles may be determined in this arrangement. This flexibility is useful, for example as the array in the peer device may be radially misaligned with the electromagnet array.

Figure 15:
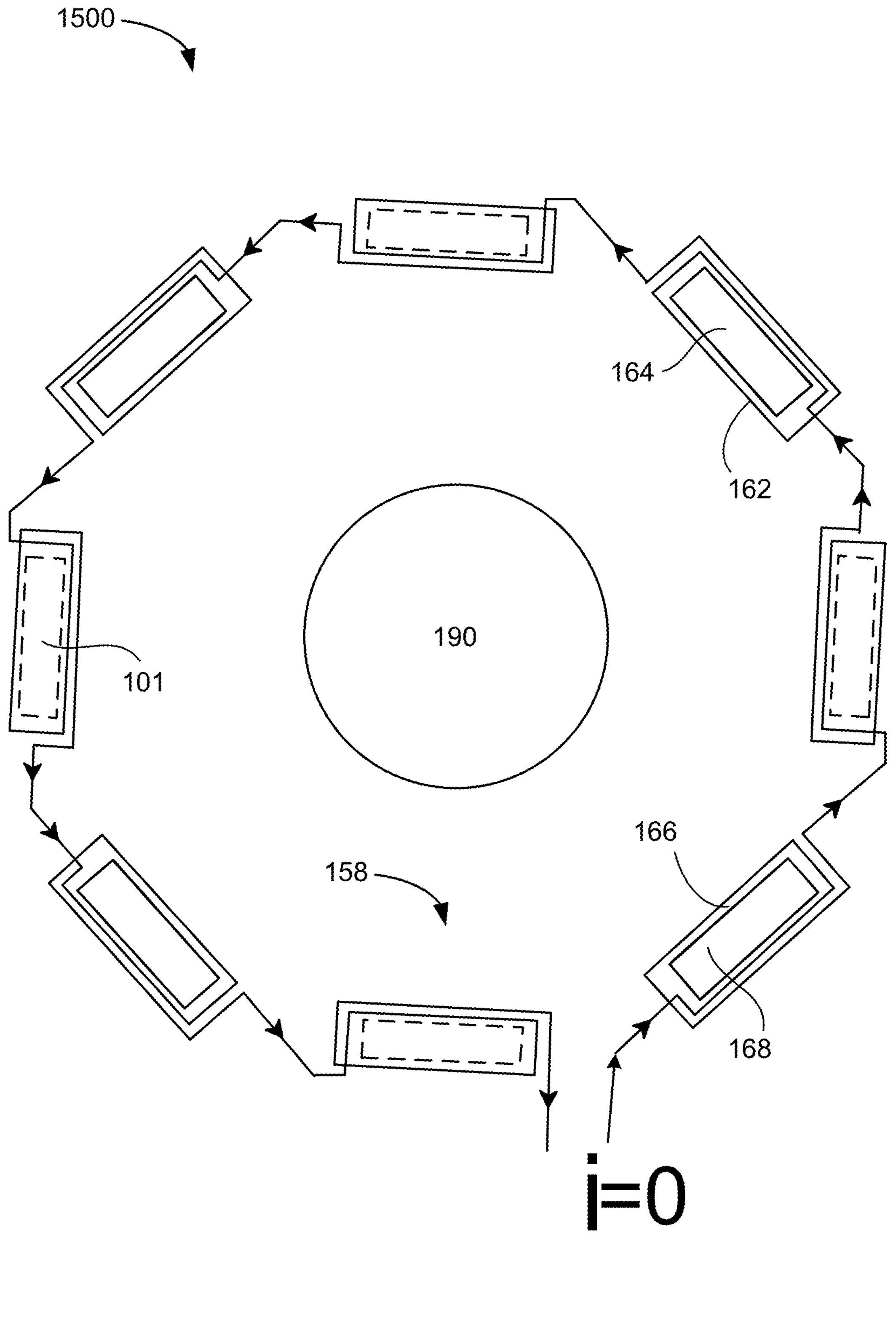
FIG. 15 is another example of an electromagnet array that is not powered, for example when the array is being used in a device in power receiver mode.

FIG. 15 is a view of another example array 1500. The array 1500 may include a plurality of electromagnets. The plurality of electromagnets may include an array 158 of electromagnets. The array 158 may include first respective coils 162 around first respective ferrites 164. The first respective coils 162 may be in series. First coils 162 around first respective ferrites 164 may be configured to receive a current and produce poles. For example, the first coils 162 may be disposed in a first coil direction around first respective ferrites 164. The first coil direction may be clockwise. A high permeable material 172 may be disposed adjacent to the array 158.

The array 160 may additionally, or alternatively, include second respective coils 166 around second respective ferrites 168. The second respective coils 166 around second respective ferrites 168 may be configured to produce poles when a current is passed through the coils. The second respective coils 166 may be in series. Second coils 166 may be disposed in a second coil direction around second respective ferrites 168. The second coil direction may be counterclockwise. The array 160 may include alternating first ferrites 164 (e.g., with first coils 162) and second ferrites 168 (e.g., with second coils 166). The array 1500 may be arranged around one or more power transfer coil 190 as described herein.

Figure 16:
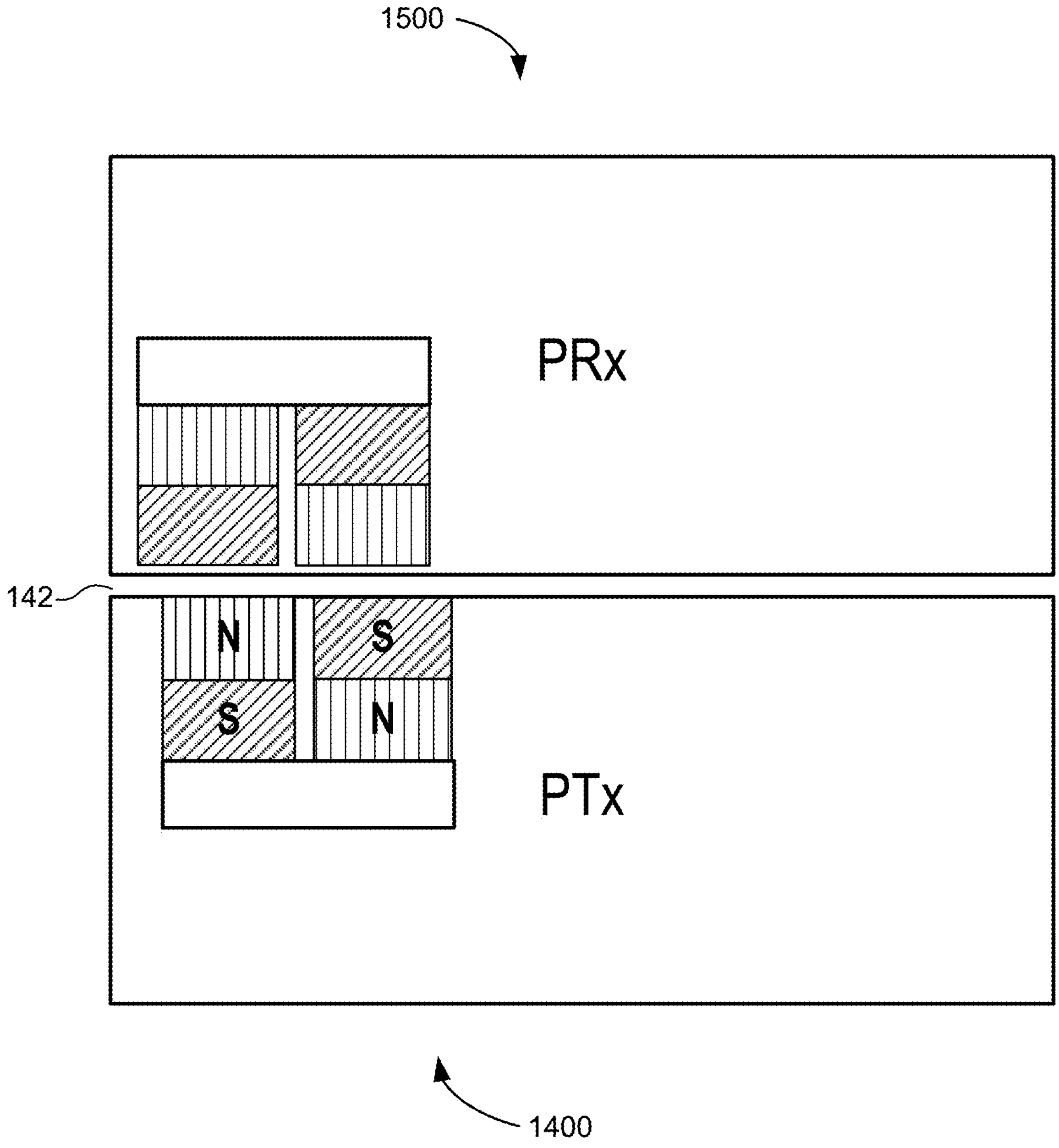
FIG. 16 is a view of an example system with an example transmitter magnetic alignment in accordance with FIG. 14 and an example receiver magnetic alignment in accordance with FIG. 15.

FIG. 16 is a view of an example system demonstrating the alignment of the transmitter mode of operation with array 1400 (FIG. 14) being aligned with the receiver mode of operation with array 1500 (FIG. 15) The array 1400 and array 1500 may be separated by an air gap 142. The electromagnetic configuration of array 1400 of the array in transmitter mode may attract the ferrites in the array 1500 associated with the receiver mode of operation in order to align the primary coil of the transmitter with the secondary coil of the receiver.

In another example, current may be applied when the device is in the receiver mode of operation. However, the DC current may be applied in the opposite direction as when in the transmitter mode of operation. In this manner, the poles created by the electromagnets may be in the opposite direction as in the transmitter configuration. In this manner, the receiver mode of operation would attract the transmitter mode of operation based on their opposite pole configurations. As mentioned earlier, the direction of current in both the devices can be altered to maximize the attraction or alignment of the peer devices.

Figure 17:
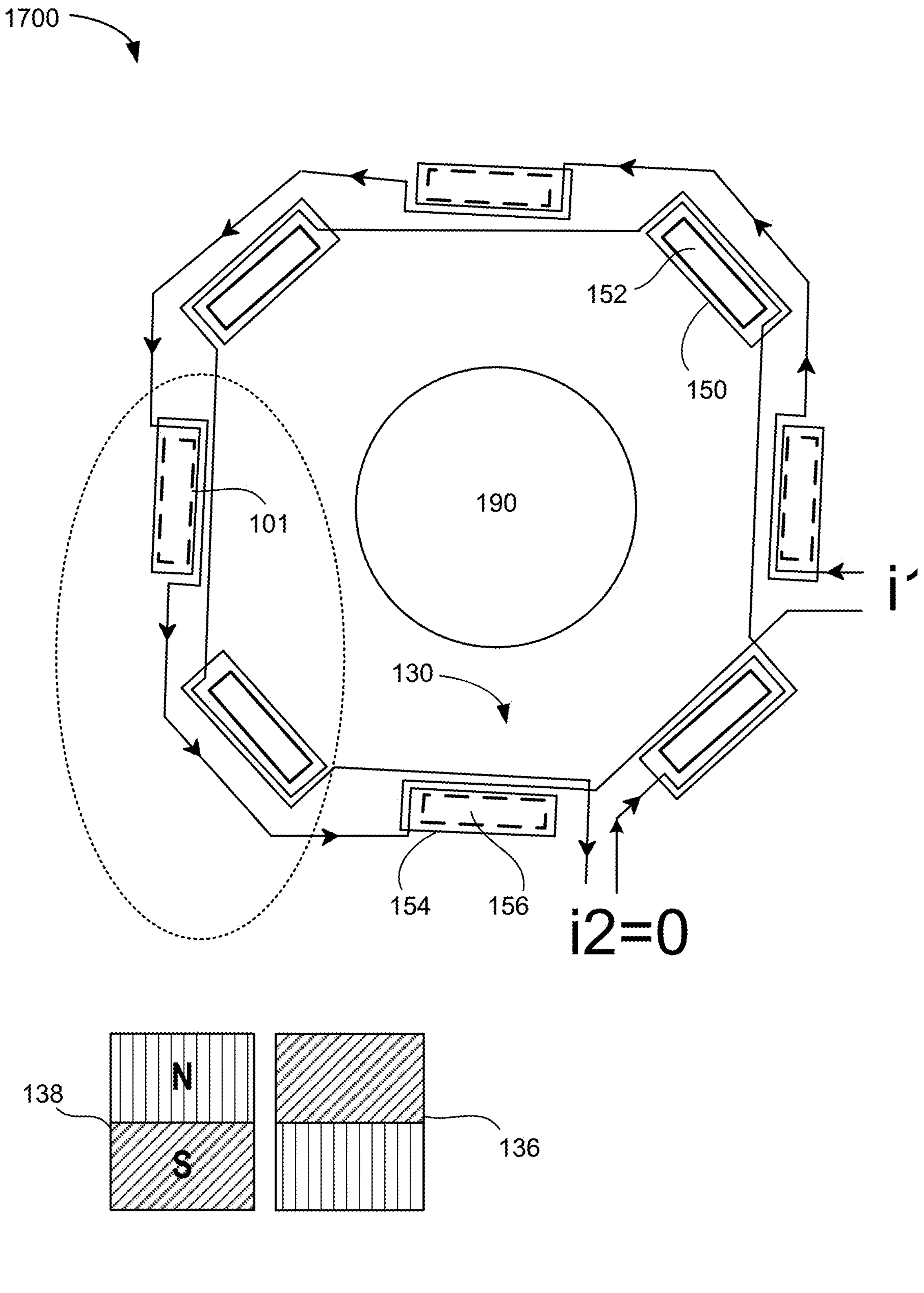
FIG. 17 is another example of an electromagnet array that facilitates alignment of a power transmitter with a peer power receiver device.

FIG. 17 is a view of another example array 1700. The array 1700 may include a plurality of electromagnets. The plurality of electromagnets may include an array 130 of electromagnets. The array 130 may include first respective coils 150 around first respective ferrites 152. The first respective coils 150 around first respective ferrites may be configured to generate a first pole direction 136 when a current (e.g., i1) is applied to the array 130 of electromagnets. The respective coils 150 may be in series and/or may be configured to be energized separately from respective coils 154 around respective ferrites 156. Coils 150 may be disposed in a first coil direction around respective ferrites. The first coil direction may be clockwise. The first pole direction 136 may be arranged such that the south pole is proximate a surface 101 of the transmitter 100. A high permeable material 170 may be disposed adjacent to the inner array 130 and/or the outer array 132. The high permeable material 170 may be adjacent to the north pole of the first pole direction 136.

Respective coils 154 around respective ferrites 156 may be configured to generate a second pole direction 138 when a current (e.g., i2) is applied to the array 130 of electromagnets. The respective coils 154 may be in series and/or may be configured to be energized separately from respective coils 150 around respective ferrites 152. Coils 154 may be disposed in a second coil direction around respective ferrites 156. The second coil direction may be counterclockwise. The second pole direction 138 may be arranged such that the north pole is proximate the surface 101 of the transmitter 100. A high permeable material may be adjacent to the south pole of the second pole direction 138. The array 1700 may be arranged around one or more power transfer coil 190 as described herein.

Figure 18:
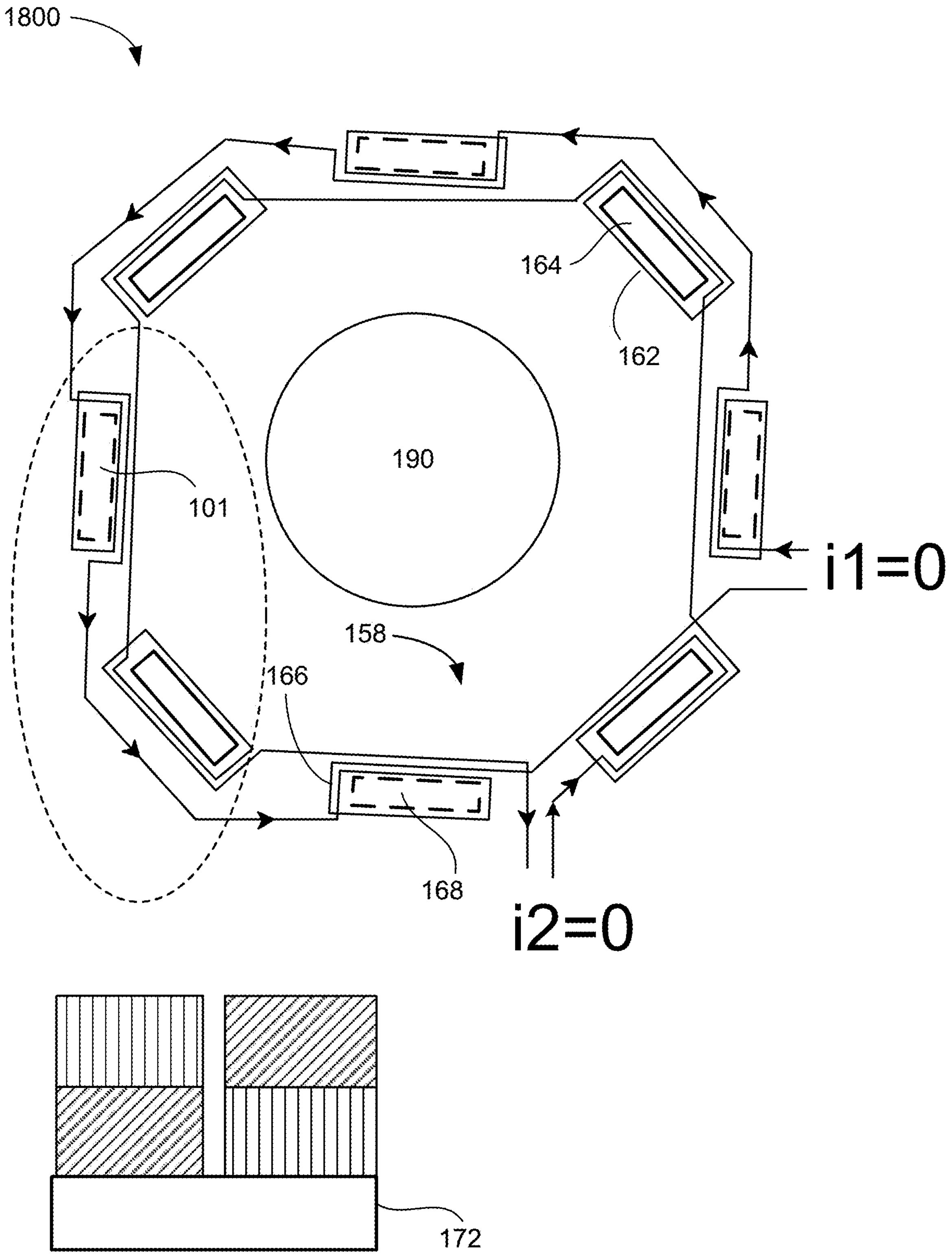
FIG. 18 is another example of an electromagnet array that is not powered, for example when the array is being used in a device in power receiver mode.

FIG. 18 is a view of another example array 1800. The array 1800 may include a plurality of electromagnets. The plurality of electromagnets may include an array 158 of electromagnets. The array 158 may include respective coils 162 around respective ferrites 164. The respective coils 162 may be in series and/or may be configured to be energized separately from respective coils 166 around respective ferrites 168. Coils 162 around respective ferrites 164 may be configured to produce an alignment flux, for example when a DC current is passed through them. For example, the coils 162 may be disposed in a first coil direction around respective ferrites 164. The first coil direction may be clockwise. A high permeable material 172 may be disposed adjacent to the array 158.

The respective coils 166 around respective ferrites 168 may be configured to produce an alignment flux when current is passed through. The respective coils 166 may be in series and/or may be configured to be energized separately from respective coils 162 around respective ferrites 164. The respective coils 166 may be in series. Coils 166 may be disposed in a second coil direction around respective ferrites 168. The second coil direction may be counterclockwise. The array 1800 may be arranged around one or more power transfer coil 190 as described herein. It may be noted that the currents i1 and i2 through the coils may be either same or different in magnitude. In many cases they may (e.g., both) be zero.

Figure 19:
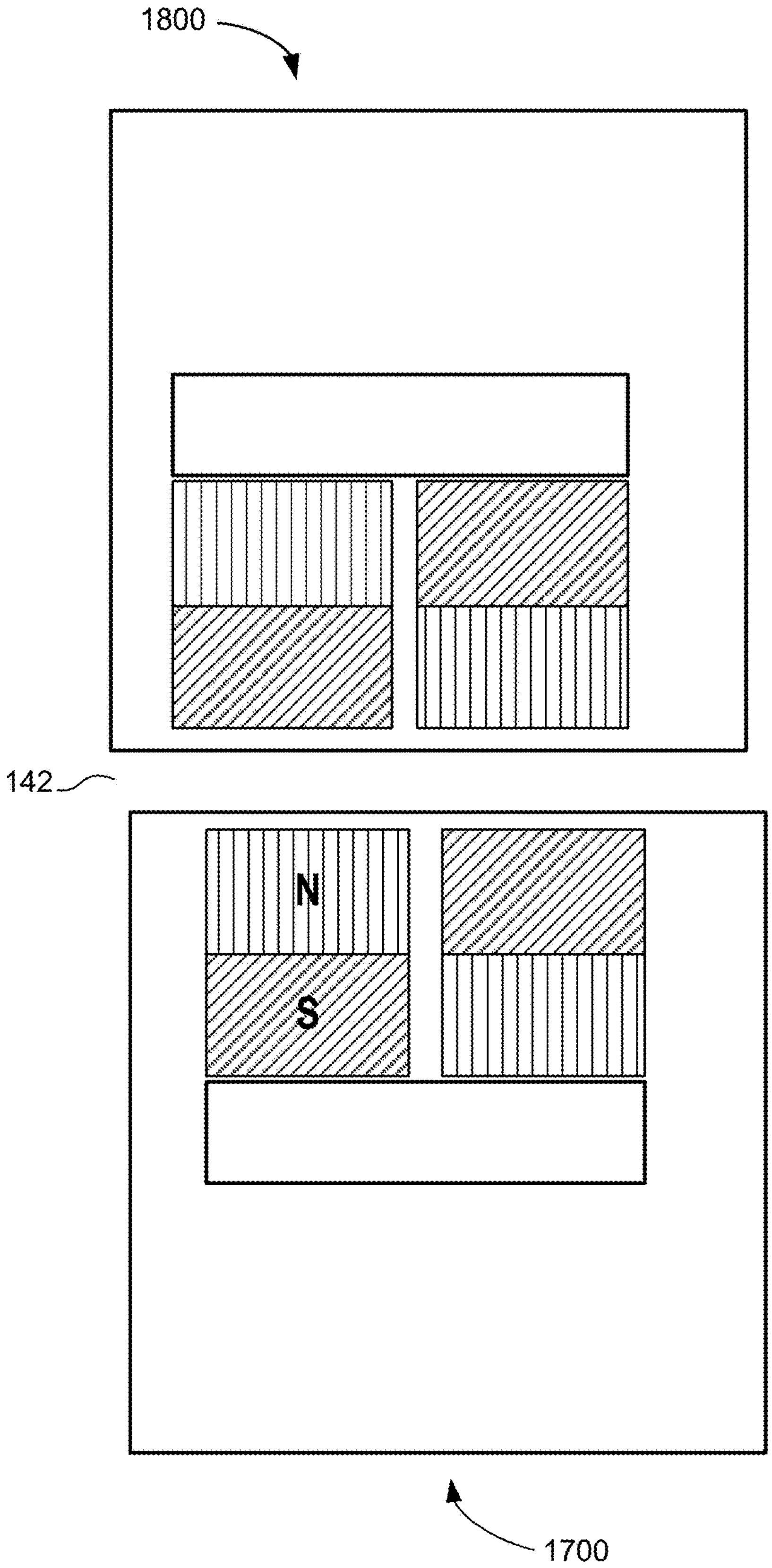
FIG. 19 is a view of an example system with an example transmitter magnetic alignment in accordance with FIG. 17 and an example receiver magnetic alignment in accordance with FIG. 18.

FIG. 19 is a view of an example system demonstrating the alignment of the transmitter mode of operation with array 1700 (FIG. 17) being aligned with the receiver mode of operation with array 1800 (FIG. 18) The array 1700 and array 1800 may be separated by an air gap 142. The electromagnetic configuration of array 1700 of the transmitter may attract the ferrites in the array 1800 associated with the receiver mode of operation in order to align the primary coil of the transmitter with the secondary coil of the receiver. It may be noted that in this example, when only one of the coil array in the transmitter is energized and all the other coils arrays in both the transmitter and receiver are not energized, the alignment may be a weak pull from the transmitter.

In another example, current may be applied when the device is in the receiver mode of operation. However, the DC current may be applied in the opposite direction as when in the transmitter mode of operation. In this manner, the poles created by the electromagnets may be in the opposite direction as in the transmitter configuration. In this manner, the receiver mode of operation would attract the transmitter mode of operation based on their opposite pole configurations.

Figure 20:
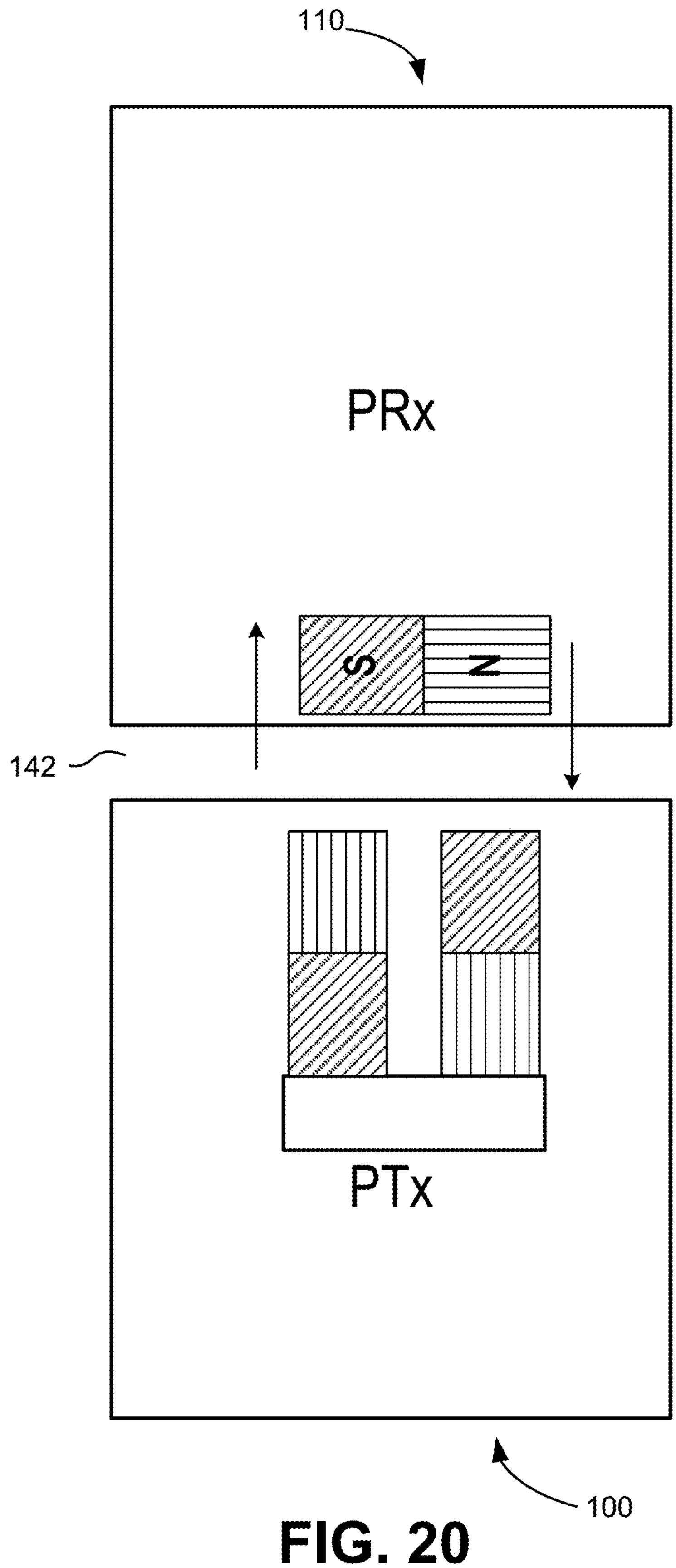
FIG. 20 is a view of an example system with an example electromagnet array in accordance with FIG. 17 and an example receiver in accordance with FIG. 3.

FIG. 20 is a view of an example system demonstrating the alignment of the transmitter mode of operation with array 1700 (FIG. 17) being aligned with the receiver mode of operation with array 112 (FIG. 3). The same also applies to the receiver array 1800 of FIG. 18. The array 1700 associated with the transmitter mode and the array 1800/112 associated with the receiver mode may be separated by an air gap 142. The electromagnetic configuration of array 1700 associated with the transmitter mode is attracted by the magnet array 1800/112 associated with the receiver mode of operation in order to align the primary coil of the transmitter with the secondary coil of the receiver.

In another example, current may be applied when the device is in the receiver mode of operation. However, the DC current may be applied in the opposite direction as when in the transmitter mode of operation. In this manner, the poles created by the electromagnets may be in the opposite direction as in the transmitter configuration. In this manner, the receiver mode of operation would attract the transmitter mode of operation based on their opposite pole configurations.

Figure 21:
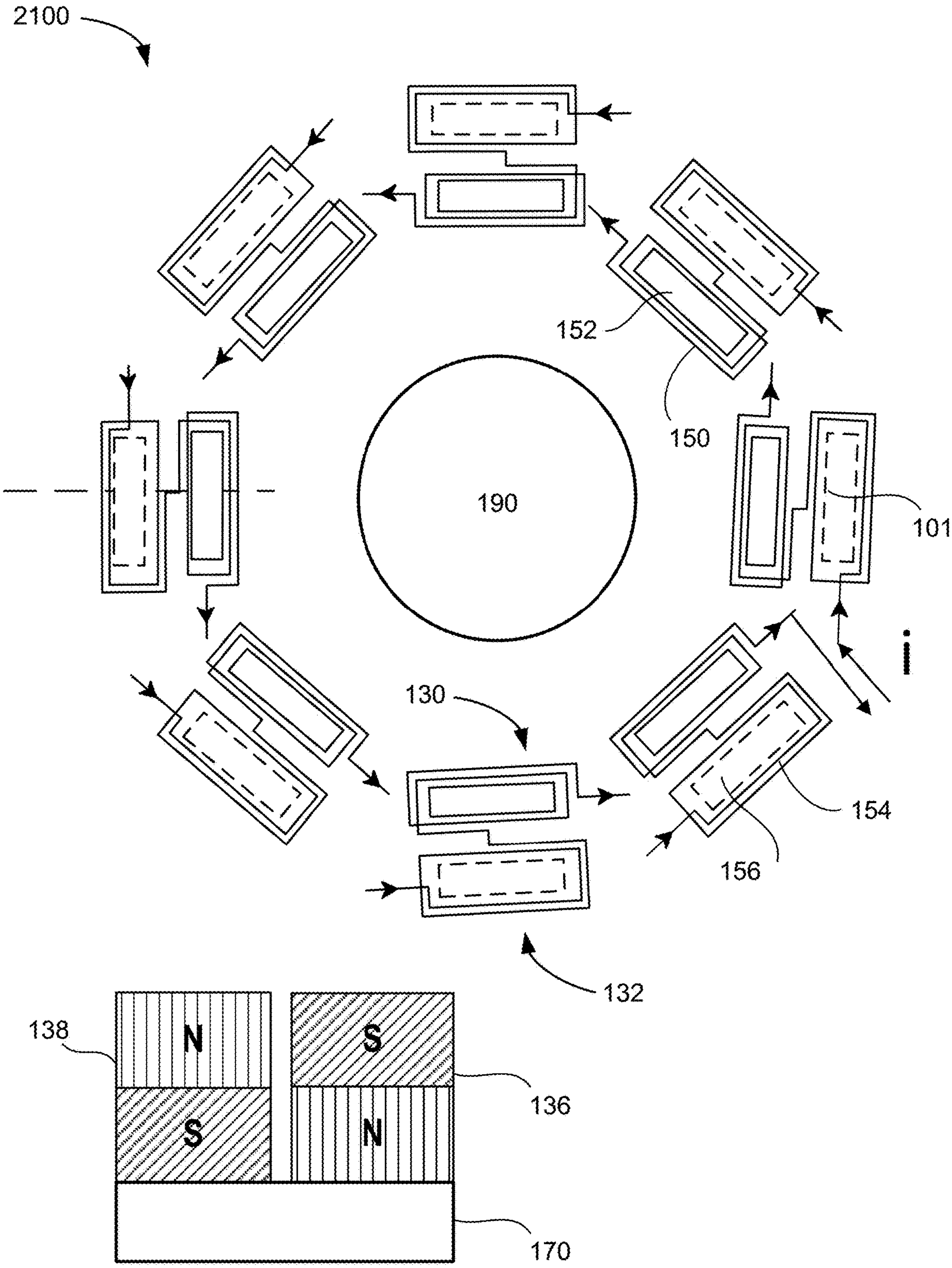
FIG. 21 is a view of an example of the electromagnet array of FIG. 17 being aligned with an example receiver with a receiver magnet configuration.

FIG. 21 is a view of an example of the electromagnet array of FIG. 17 being aligned with an example receiver with a receiver magnet configuration. The array 2100 may include a plurality of electromagnets. The plurality of electromagnets may include an inner array 130 of electromagnets and an outer array 132 of electromagnets. Each of the electromagnets in the inner array 130 may include respective coils 150 around respective ferrites 152. The coils may be individually powered by different circuits to drive currents of different magnitudes. As a result, the alignment flux produced by the different electromagnets may be different. The respective coils 150 around respective ferrites may be configured to generate a first pole direction 136 when a current (e.g., i) is applied to the inner array 130 of electromagnets. For example, the coils 150 may be disposed in a first coil direction around respective ferrites. The first coil direction may be clockwise. The first pole direction 136 may be arranged such that the south pole is proximate a surface 101 of the transmitter 100. A high permeable material 170 may be disposed adjacent to the inner array 130 and/or the outer array 132. The high permeable material 170 may be adjacent to the north pole of the first pole direction 136. One or more of the respective coils 150 around respective ferrites 152 may be powered with a lower power, for example than one or more respective coils 154 around respective ferrites 156 of the outer array 132.

Each of the electromagnets in the outer array 132 may include respective coils 154 around respective ferrites 156. The respective coils 154 around respective ferrites 156 may be configured to generate a second pole direction 138 when a current (e.g., i) is applied to the outer array 132 of electromagnets. For example, the coils 154 may be disposed in a second coil direction around respective ferrites 156. The second coil direction may be counterclockwise. The second pole direction 138 may be arranged such that the north pole is proximate the surface 101 of the array 2100. One or more of the respective coils 154 around respective ferrites 156 may be powered with a lower power, for example than one or more respective coils 150 around respective ferrites 152 of the inner array 130. The high permeable material 170 may be adjacent to the south pole of the second pole direction 138. The array 2100 may be arranged around one or more power transfer coil 190 as described herein.

Figure 22:
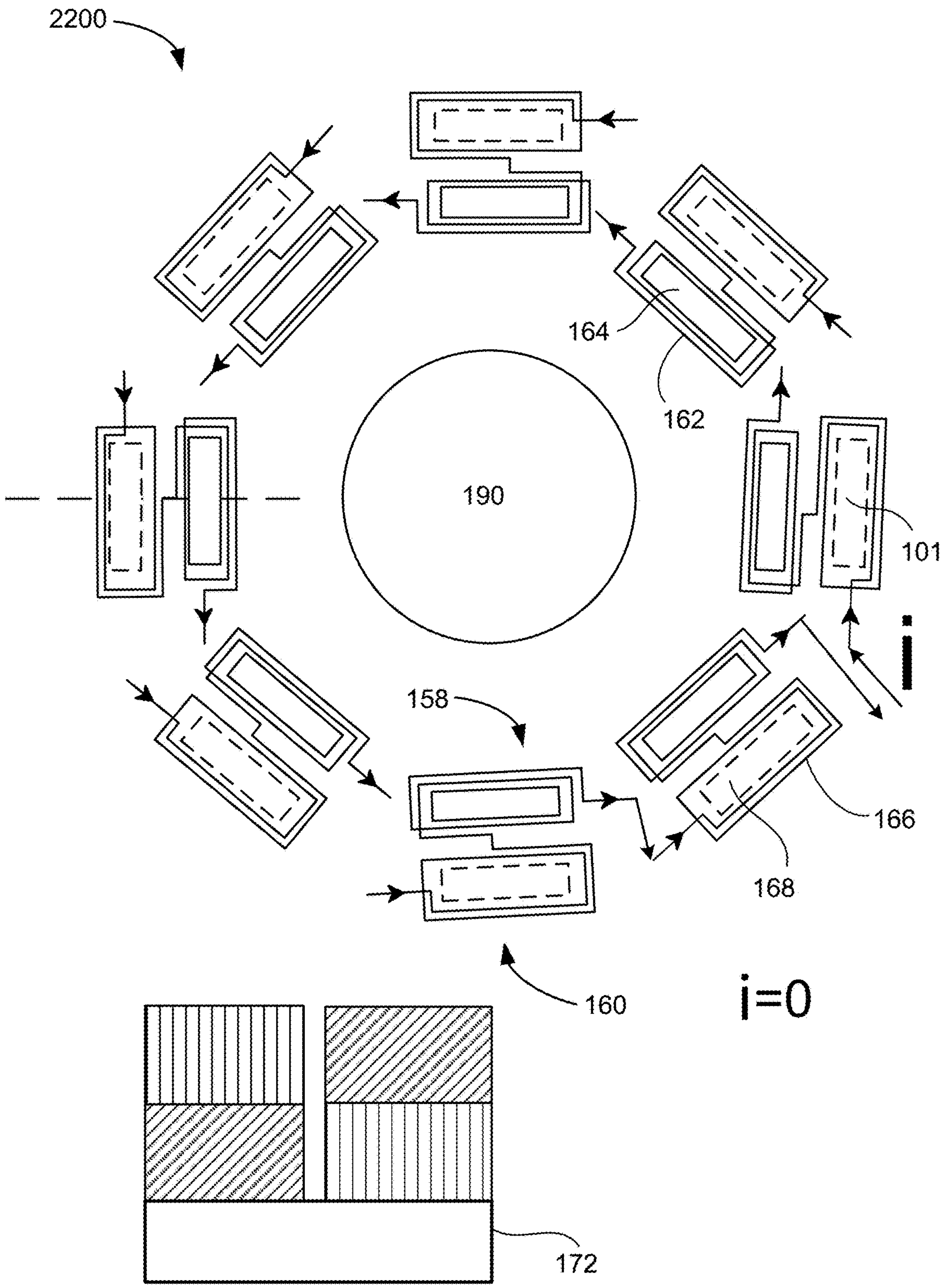
FIG. 22 is another example of an electromagnet array that is not powered, for example when the array is being used in a device in power receiver mode.

FIG. 22 is another example of an electromagnet array that is not powered, for example when the array is being used in a device in power receiver mode. The array 2200 may include a plurality of electromagnets. The plurality of electromagnets may include an inner array 158 of electromagnets and an outer array 160 of electromagnets. Each of the electromagnets in the inner array 158 may include respective coils 162 around respective ferrites 164. The respective coils 162 around respective ferrites may be configured to produce a current, for example when magnetic flux is received. For example, the coils 162 may be disposed in a first coil direction around respective ferrites 164. The first coil direction may be clockwise. The coils may be individually powered by different circuits to drive currents of different magnitudes. As a result, the alignment flux produced by the different electromagnets are different. A high permeable material 172 may be disposed adjacent to the inner array 158 and/or the outer array 160.

Each of the electromagnets in the outer array 160 may include respective coils 166 around respective ferrites 168. The respective coils 166 around respective ferrites 168 may be configured to produce a current, for example when magnetic flux is received. For example, the coils 166 may be disposed in a second coil direction around respective ferrites 168. The second coil direction may be counterclockwise. The array 2200 may be arranged around one or more power transfer coil 190 as described herein.

Figure 23:
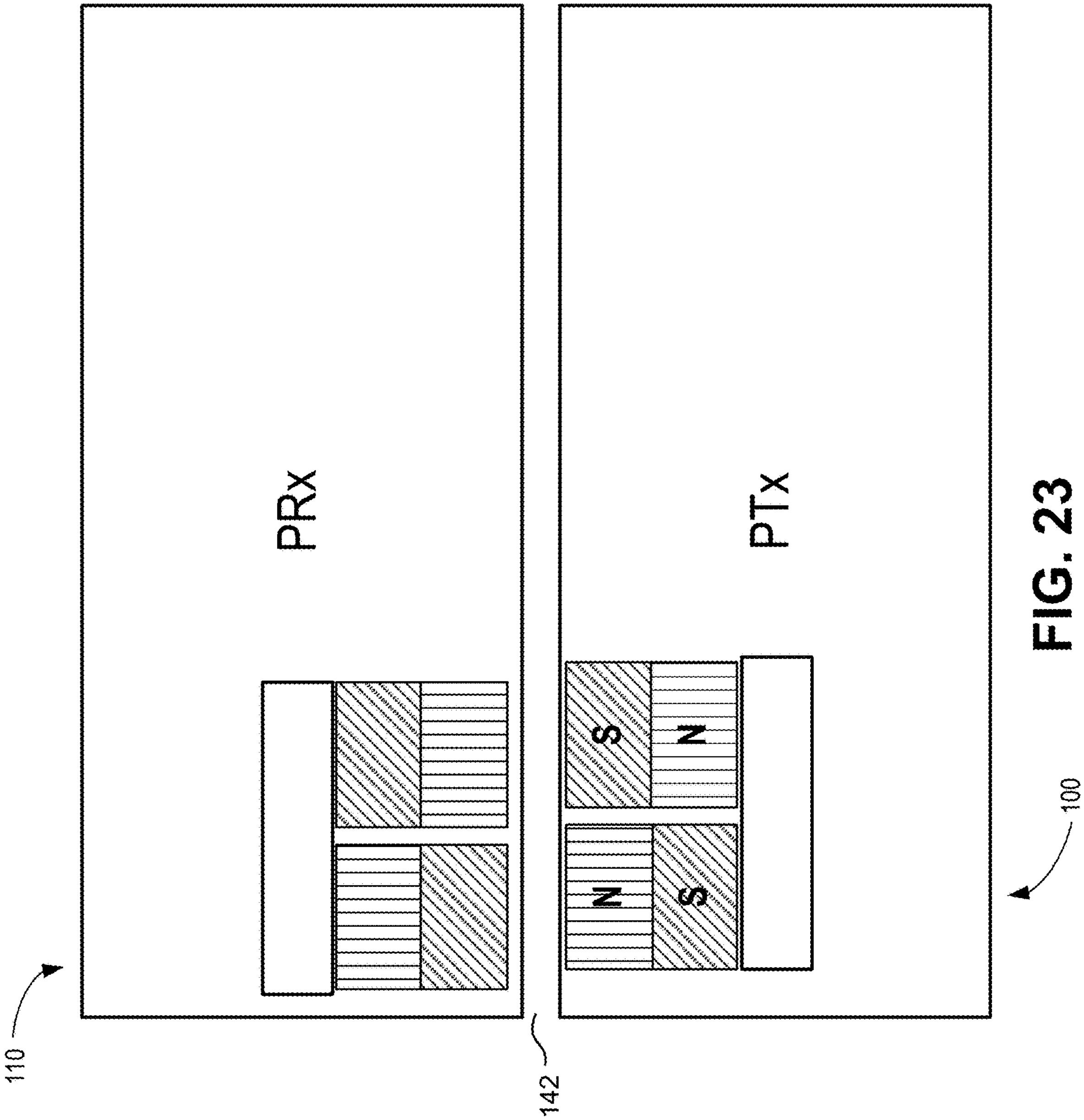
FIG. 23 is a view of an example system with an electromagnet array in accordance with FIG. 21 and an electromagnet array in accordance with FIG. 22.

FIG. 23 is a view of an example system with an example array 2100 associated with the transmitter mode in accordance with FIG. 21 and an example array 2200 associated with the receiver mode in accordance with FIG. 22. The array 2100 and array 2200 may be separated by an air gap 142. During a reverse charging operation ferrites 152, 156, 164, and/or 168 may act to close a flux path, which may result in no repulsion between the array 2100 and the array 2200.

In another example, current may be applied when the device is in the receiver mode of operation. However, the DC current may be applied in the opposite direction as when in the transmitter mode of operation. In this manner, the poles created by the electromagnets may be in the opposite direction as in the transmitter configuration. In this manner, the receiver mode of operation would attract the transmitter mode of operation based on their opposite pole configurations. If no current is applied to the coils 162 and/or coils 166, or current is applied only to a few coils of coils 162 and/or coils 166 of the array 2200, the receiver will still latch to the transmitter, however, the latch may not be as strong as the latch between the transmitter and receiver while a current is applied to the coils 162 and/or the coils 166 of the receiver.

Figure 24:
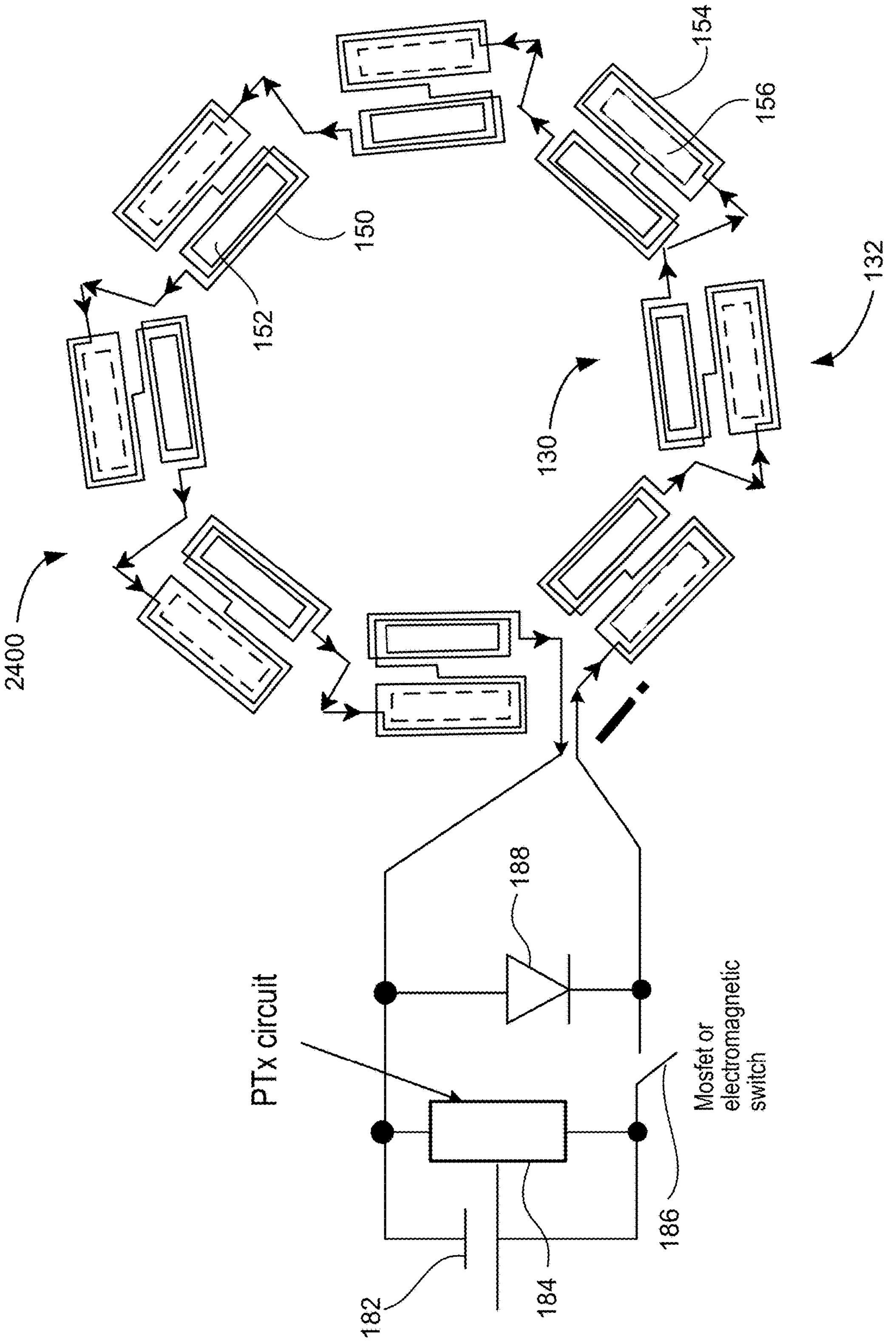
FIG. 24 is an example implementation for controlling the electromagnet array, for example when the device is operating in the power transmitter mode.

FIG. 24 is an example of an example implementation for controlling the electromagnet array, for example when the device is operating in the power transmitter mode. For example, as shown in FIG. 24, the power transmitter circuit 184 (e.g., the driver and primary coil) may be connected in parallel with the circuit for controlling the current through the electromagnetic array 2400. A switch 186, such as metal oxide semiconductor field effect transistor (MOSFET) or an electromagnetic switch and/or a diode 188 may contribute to a simple circuit to control the current through the electromagnet array 2400. A control unit (not shown) may be configured to control switch 186 in order to apply or not apply a voltage causing a current to flow through the electromagnet array 2400. For example, the control unit may determine when to turn on and/or turn off one or more (or all) elements of the electromagnet array 2400. The switch 186 may be controlled in an on/off fashion to regulate the current through the electromagnetic array. For example, the switch may be turned on (e.g., only) to allow the current to settle to value determined by the resistance of the coils and the applied voltage. The control unit power transmitter circuit 184, diode 188, and/or electromagnet array 2400 may be connected to a power DC power supply 182, for example a battery. The MOSFET switch 186 and/or diode 188 may be replaced by a full bridge circuit, for example to allow the control to regulate the current in both positive and negative magnitudes, and/or control (e.g., reverse) the polarity of the magnetic fields produced by the electromagnets.

Additionally, or alternatively, the switch may include and/or be supplemented by a regulator/convertor or a pulse width modulation (PWM) circuit. Use of the regulator and/or PWM circuit may allow for more granular control of the current supplied to the electromagnet array as compared to a simple on/off switch. In this manner, the amount of power used by the electromagnet array can be varied depending on the application. For example, in a first mode of operation, a relatively lower current may be provided to the electromagnet array, which may result in less power during operation. In a second mode of operation, a relatively higher current may be provided to the electromagnet array, which may result in increased power during operation but a stronger magnetic operation that results in increased coupling with the peer device. The switch may be configured to control current, for example latching/coupling current. One or more diodes 188 may additionally, or alternatively, be included in the control unit. The one or more diodes may be in parallel with the transmitter circuit for example.

Additionally, or alternatively, separate switches/control may be applied to different sub-arrays within an electromagnetic array. For example, FIGS. 12 and 13 illustrate an example where the inner array of electromagnets (e.g., having a first polarity) can be separately controlled using current i2 from the outer array of electromagnets using current i1. In this example, each of the inner array and outer array may be controlled using separate switches and/or converters such as a converter having two half bridges for example. In this manner, a higher magnetic attraction can be achieved by powering both the inner and outer array, at the expense of relatively higher power usage. In a second mode of operation, one of the inner array or outer array may be powered, while the other array may not be powered. In this second mode of operation, there may still be some level of magnetic attraction due to the power sub-array, but power may be saved due to one of the sub-arrays not being powered. The control unit may be configured to determine whether to apply any current and/or the amount for each of the sub-arrays. For example, a regulator and/or PWM circuit may be included for each sub-array so that control of each sub-array can be made more granular. A converter having two half bridges may be used to allow the control to regulate the current in both positive and negative polarities.

A receiver as described herein may be configured to operate in a power transmitter mode and a power receiver mode. A transmitter as described herein may be configured to operate in a power transmitter mode and a power receiver mode. The receiver and/or the transmitter may (e.g., each) include a control unit. The control unit may be configured to operate in a power transmitter mode and/or a power receiver mode. Additionally, the control unit may be configured to determine that a transmitter and/or receiver is operating in a power transmitter mode and/or a power receiver mode.

The control unit may be configured to determine when to supply a current to one or more of the plurality of electromagnets. For example, the control unit may determine to apply a current to a subset of the plurality of electromagnets. The subset of the plurality of electromagnets may include (e.g., one of) a first array and/or a second array. For example, the control unit may determine to apply a current to the inner array 130 or the outer array 132 of the transmitter 100 in FIG. 13. The control unit may determine to supply the current based on whether a system (e.g., the control unit) is operating in at least one of the power transmitter mode or the power receiver mode. For example, if (e.g., determined to be) operating in the power transmitter mode, the control unit may be configured to determine to apply a current to one or more of the plurality of electromagnets. Additionally, or alternatively, if (e.g., determined to be) operating in power receiver mode, the control unit may be configured to determine to not apply a current to one or more of the plurality of electromagnets. The control unit may be configured to determine to apply the current to one or more of the plurality of electromagnets on condition that a battery of the apparatus is above a threshold power/charge level, for example when the apparatus is operating in the power receiver mode.

When, for example, (e.g., initially) operating in the power transmitter mode, the control unit may be configured to determine to apply a current to one or more of the plurality of electromagnets. Additionally, or alternatively, the control unit may be configured to determine to stop applying current to one or more of the plurality of electromagnets, for example based on determining that at least one secondary coil of a peer power receiver device is in alignment with the at least one power transfer coil. The control unit may determine to change from the power transmitter mode to the power receiver mode, or from the power receiver mode to the power transmitter mode. For example, the control unit may determine to change modes based on a threshold power/charge level of a battery. The threshold power/charge level may be 20%. Additionally, or alternatively, the control unit may be configured to determine to apply and/or change a current based on the threshold. For example, a control unit in receiver mode and/or at the receiver side may determine to apply and/or change a current to an array based on the threshold power/charge level of a battery. The control unit may be configured to determine whether to activate a current in one or more of the plurality of electromagnets based on a power/charge level (e.g., the threshold) of one or more of a battery in the device or of a battery of a peer power receiver device. The battery of the peer power receiver device may be electrically connected to one or more electromagnets (e.g., an array of electromagnets).

One or more of the plurality of electromagnets may be enabled (e.g., have a current applied) to enable alignment. For example, a subset of electromagnets and/or one array may be enabled depending on the relative sizes of the transmitter device and the receiver device. There is alignment between devices when the magnetic field is aligned between the transmitter to the receiver. For example, FIG. 10 depicts good alignment between the transmitter 100 and the receiver 110. An air gap 142 between the transmitter 100 and receiver 110 may also affect power transfer. The better the receiver and the transmitter are aligned the more charge can be transferred more quickly during charging, for example during reverse charging.

Alignment may be improved by energizing (e.g., having a current applied to) one or more of the electromagnets. Additionally, or alternatively, power drawn for alignment may be controlled by varying the current in one or more of the electromagnets. For example, the control unit may be configured to determine to increase and/or decrease current to the one or more electromagnets. The control unit being configured to increase and/or decrease current to the one or more electromagnets may be based on detection of one or more characteristics. For example, the control unit may be configured to detect a voltage at the receiver, which may be based on a (e.g., small) change in current at the transmitter side. The control circuit may be configured to determine to turn off and/or change applied current, for example based on alignment status. For example, a receiver device control unit may determine to turn off and/or change applied current after reaching a time threshold.

Additionally, or alternatively, the control circuit may be configured to communicate with the receiver device and/or the transmitter device. Communication between receiver and transmitter devices may include one or more characteristics of a device. The one or more characteristics may include one or more of device power/charging status (e.g., in a battery), device capabilities, device (e.g., array) size, and/or device (e.g., array) position. The communication may additionally, or alternatively, include an indication of the mode of a peer device (e.g., whether the peer device is in transmitter mode or receiver mode). The control unit may be configured to determine to apply a current to an array based on the indication of the mode of the peer device. For example, a control unit in a transmitter mode may determine to apply a current to one or more of the plurality of electromagnets based on an indication that the peer device is in receiver mode.

The control unit may be configured to determine to apply an initial current (e.g., coupling current) to one or more of the plurality of electromagnets, for example to latch/couple to a receiver device. The control unit may (e.g., then) decrease the current, for example to hold the receiver device in place. The control unit may be configured to determine information associated with at least one secondary coil of a peer power receiver device. Based on the information associated with the at least one secondary coil of the peer power receiver device, the control unit may determine whether to activate a coupling current in the at least one power transfer coil for coupling to the at least one secondary coil of the peer power receiver device. The information may include one or more of the characteristics and/or thresholds disclosed herein. The information may also include an indication of whether the peer device is an authentic one and/or the type of alignment arrangement associated with the peer device. Once the data is available for example, the control unit may decide to regulate a current through the electromagnets. For example, the control unit may be configured to determine to decrease the coupling current based on one or more of a time threshold and/or on a power level of one or more of the battery or of a second battery in a peer power receiver device. The battery in the peer power receiver device may be electrically connected to the at least one secondary coil of the peer power receiver device.

The control unit may be configured to determine the manner in which to supply current (e.g., and thereby control the polarity of) the electromagnets in the array based on a user input. For example, if the wireless power transmitter/receiver unit is implemented in a smartphone device, the user interface (e.g., touchscreen) portion of the device may allow the user to configure when the device is in power transmitter or power receiver mode of operation. When the user selects power receiver mode of operation, the electromagnetic array may not be powered. In another example, when the user selected power receiver mode, the electromagnets may be powered using current in a first direction. When the user selects power transmitter mode, the electromagnets may be powered using current in a second (opposite) direction. In an example, when the user selected power receiver mode, the electromagnets may be powered on condition that a current battery level is above a threshold (e.g., 20%). In an example, when the user selected power transmitter mode, the electromagnets may be powered irrespective of the current battery level. Additionally, or alternatively, user input may be associated with input from a power and/or volume button on the device. For example, a user may actuate a power and/or volume button on the device to indicate device capabilities (e.g., to a peer device), for example whether the device is in/is capable of power transmission and/or power receipt. Additionally, or alternatively, an indication associated with a control chip, for example in a mother board of the device, may indicate device capabilities (e.g., as described herein). Additionally, or alternatively, a soft signal may activate and/or deactivate devices as described herein. For example, the devices may include electromagnet(s), array(s), and/or control unit(s). The soft signal may indicate how to control the device(s) and/or information (e.g., as described herein).

In order to conserve power, a duty cycle may be applied to the current supplied to the electromagnetic array. For example, the DC current may be applied for a an "on period" period to the current being stopped for an "off period." This on/off period cycle may be periodic. Use of a duty cycle may conserve power. A first duty cycle with a relatively longer portion corresponding to the on period may be utilized for power transmitter mode while a second duty cycle with a relatively shorter on period may be utilized in power receiver mode.

The device may be configured to transmit information regarding the electromagnet status of its array to a peer device, for example using communication employed via the power transfer coils. For example, bits of a status header filed could be used to indicate the status of the electromagnets. In an example, the device could indicate in the header filed whether the electromagnets are in a powered power transmitter state, a powered power receiver state, or an unpowered state. For example, such a state indication could be provided during a status sweep. In an example, the status could be indicated using an extended ID packet sent to the peer device.

In an example, the control unit may control the configuration of the electromagnet array based on communications received from a peer device. For example, if the peer device indicates that it is a power receiver and/or it is operating in a power receiver mode, then the control unit may configure the electromagnets in a power transmitter mode of operation. If the peer device indicates that it is a power transmitter and/or it is operating in a power transmitter mode, then the control unit may configure the electromagnets in a power receiver mode of operation and/or may not apply current to the electromagnets. For example, such communications may be exchanged during a power receiver and power transmitter identification phase of a power transfer protocol. In an example, a peer device may send a request to the control unit to turn on the electromagnet array, for example prior to beginning power transfer.

Alternatively, or additionally, the status and or request may also be communicated during a ping phase, a configuration phase, or a negotiation phase of the wireless power transfer session.

The control unit may be include a processor and/or a memory. For example, the control unit may be an integrated circuit (IC) configured to perform one or more of the control unit functions described herein. The control unit may be a general purpose processor, special purpose processor, an application specific integrated circuit (ASIC), digital signal processor (DSP), or any other hardware and/or software based logical processing device that is configurable to control the power transmitter/receiver device described herein.

It should be emphasized that the above-described embodiments of the present disclosure, particularly, any detailed discussion of particular examples are merely possible examples of implementations and are set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus configured to operate in a power transmitter mode and a power receiver mode, the apparatus comprising:

a power transfer coil, the power transfer coil configured to:

receive a current to produce magnetic flux when the apparatus is operating in the power transmitter mode, and produce a current based on received magnetic flux when the apparatus is operating in the power receiver mode; and a plurality of electromagnets arranged in an array around the power transfer coil; and a control unit, the control unit configured to determine when to supply a current to the plurality of electromagnets based on whether the apparatus is operating in the power transmitter mode or the power receiver mode.

2. The apparatus of claim 1, wherein the control unit is configured to apply a current to the plurality of electromagnets based on determining that the apparatus is operating in the power transmitter mode.

3. The apparatus of claim 1, wherein the control unit is configured to determine to not apply a current to the plurality of electromagnets based on determining that the apparatus is operating in the power receiver mode.

4. The apparatus of claim 1, wherein each of the plurality of electromagnets comprises a respective ferrite of a plurality of ferrites, and respective coils around the plurality of ferrites are configured in an alternating pattern such that the plurality of electromagnets generates an alternating pole arrangement when a current is applied to the plurality of electromagnets.

5. The apparatus of claim 1, wherein each of the plurality of electromagnets comprises a respective ferrite of a plurality of ferrites, the plurality of electromagnets comprises an inner array of electromagnets and an outer array of electromagnets, the inner array of electromagnets comprises respective coils around the respective ferrites to generate a first pole direction when a current is applied to the inner array of electromagnets, and the outer array of electromagnets comprises respective coils around the respective ferrites to generate a second pole direction when a current is applied to the outer array of electromagnets.

6. The apparatus of claim 5, wherein each of the plurality of electromagnets are electrically connected in series, wherein an electromagnet of the plurality of electromagnets comprised in the inner array is electrically connected in series to two respective electromagnets of the plurality of electromagnets comprised in the outer array, and an electromagnet of the plurality of electromagnets comprised in the outer array is electrically connected in series to two respective electromagnets of the plurality of electromagnets comprised in the inner array.

7. The apparatus of claim 5, wherein each of the plurality of electromagnets comprised in the inner array are electrically connected in series, and each of the plurality of electromagnets comprised in the outer array are electrically connected in series.

8. The apparatus of claim 1, wherein the control unit is configured to determine to apply a current to the plurality of electromagnets when the apparatus is operating in the power receiver mode on condition that a battery of the apparatus is above a threshold charge level.

9. The apparatus of claim 1, wherein the control unit is configured to:

determine to apply a current to the plurality of electromagnets when the apparatus is initially operating in the power transmitter mode; and determine to stop applying current to the plurality of electromagnets based on determining that at least one secondary coil of a peer power receiver device is in alignment with the power transfer coil.

10. The apparatus of claim 1, wherein the control unit is configured to determine to apply a current to a subset of the plurality of electromagnets.

11. The apparatus of claim 1, wherein the control unit is configured to determine whether to activate a current in the power transfer coil based on a charge level of one or more of a battery of the apparatus or of a second battery electrically connected to a secondary coil of a peer power receiver device.

12. The apparatus of claim 1, wherein the control unit is configured to:

determine information associated with a secondary coil of a peer power receiver device; and determine, based on the information associated with the secondary coil of the peer power receiver device, whether to activate a coupling current in the power transfer coil for coupling to the secondary coil of the peer power receiver device.

13. The apparatus of claim 12, wherein the control unit is configured to determine to decrease the coupling current based on one or more of a time threshold or on a charge level of one or more of a battery of the apparatus or of a second battery electrically connected to the secondary coil of the peer power receiver device.

14. A method for power transfer using a power transfer coil, a plurality of electromagnets arranged in an array around the power transfer coil, and a control unit configured to operate in a power transmitter mode and a power receiver mode, the method comprising:

receiving a current to produce magnetic flux if the control unit is operating in the power transmitter mode;

producing a current in the power transfer coil based on received magnetic flux if the control unit is operating in the power receiver mode; and determining when to supply a current to the plurality of electromagnets arranged in an array around the power transfer coil based on whether the control unit is operating in the power transmitter mode or the power receiver mode.

15. The method of claim 14, comprising applying a current to the plurality of electromagnets based on determining that the control unit is operating in the power transmitter mode.

16. The method of claim 14, comprising determining to not apply a current to the plurality of electromagnets based on determining that the control unit is operating in the power receiver mode.

17. The method of claim 14, wherein each of the plurality of electromagnets comprise a respective ferrite of a plurality of ferrites and respective coils around the plurality of ferrites are configured in an alternating pattern such that the plurality of electromagnets generate an alternating pole arrangement when a current is applied to the plurality of electromagnets.

18. The method of claim 14, wherein each of the plurality of electromagnets comprises a respective ferrite of a plurality of ferrites, the plurality of electromagnets comprises an inner array of electromagnets and an outer array of electromagnets, the inner array of electromagnets comprises respective coils the respective ferrites to generate a first pole direction when a current is applied to the inner array of electromagnets, and the outer array of electromagnets comprises respective coils around the respective ferrites to generate a second pole direction when a current is applied to the outer array of electromagnets.

19. The method of claim 18, wherein each of the plurality of electromagnets are electrically connected in series, wherein an electromagnet of the plurality of electromagnets comprised in the inner array is electrically connected in series to two respective electromagnets of the plurality of electromagnets comprised in the outer array, and an electromagnet of the plurality of electromagnets comprised in the outer array is electrically connected in series to two respective electromagnets of the plurality of electromagnets comprised in the inner array.

20. The method of claim 18, wherein each of the plurality of electromagnets comprised in the inner array are electrically connected in series, and each of the plurality of electromagnets comprised in the outer array are electrically connected in series.

21. An apparatus configured to operate in a power transmitter mode, the apparatus comprising:

a power transfer coil;

a plurality of electromagnets arranged in an array around the power transfer coil; and a control unit, the control unit configured to determine when to supply a current to the plurality of electromagnets based on the apparatus operating in the power transmitter mode.

22. An apparatus configured to operate in a power receiver mode, the apparatus comprising:

a power transfer coil;

a plurality of electromagnets arranged in an array around the power transfer coil; and a control unit, the control unit configured to determine when to supply a current to the plurality of electromagnets based on the apparatus operating in the power receiver mode.

* * * * *